US009485557B2

(12) United States Patent
Wilcox et al.

(10) Patent No.: US 9,485,557 B2
(45) Date of Patent: Nov. 1, 2016

(54) DEVICE ACCESSORY WITH SPEAKERS

(71) Applicant: 4 Audio LLC, Auburn, CA (US)

(72) Inventors: Clinton "Bud" Wilcox, Grass Valley, CA (US); Bob Fullerton, Morgan Hill, CA (US)

(73) Assignee: 4 Audio LLC, Auburn, CA (US)

( * ) Notice: Subject to any disclaimer, the term of this patent is extended or adjusted under 35 U.S.C. 154(b) by 36 days.

(21) Appl. No.: 14/721,827

(22) Filed: May 26, 2015

(65) Prior Publication Data

US 2015/0341712 A1 Nov. 26, 2015

Related U.S. Application Data

(60) Provisional application No. 62/002,752, filed on May 23, 2014.

(51) Int. Cl.
| | |
|---|---|
| *H04R 9/06* | (2006.01) |
| *H04R 1/02* | (2006.01) |
| *H04M 1/11* | (2006.01) |
| *H04M 1/04* | (2006.01) |
| *H04M 1/725* | (2006.01) |
| *H04R 7/04* | (2006.01) |
| *H04M 1/60* | (2006.01) |

(52) U.S. Cl.
CPC .............. *H04R 1/02* (2013.01); *H04M 1/04* (2013.01); *H04M 1/11* (2013.01); *H04M 1/72527* (2013.01); *H04R 7/045* (2013.01); *H04M 1/6016* (2013.01); *H04R 2499/11* (2013.01)

(58) Field of Classification Search
None
See application file for complete search history.

(56) References Cited

U.S. PATENT DOCUMENTS

| | | | | |
|---|---|---|---|---|
| 2012/0074006 | A1* | 3/2012 | Monaco ................. | H04M 1/15 206/320 |
| 2015/0163936 | A1* | 6/2015 | Le Gette ............... | F16M 11/04 206/45.2 |
| 2016/0014489 | A1* | 1/2016 | Davis ..................... | H04R 1/026 381/333 |
| 2016/0234356 | A1* | 8/2016 | Thomas ............... | H04B 1/3888 |

* cited by examiner

*Primary Examiner* — Muhammad N Edun
(74) *Attorney, Agent, or Firm* — Temmerman Law Office; Mathew J. Temmerman

(57) ABSTRACT

A device accessory to produce high quality high volume sound, comprising a clip case for holding the mobile device and a speaker unit that provides high quality high volume sound produced from the mobile device. The clip case further comprises a base portion attached to a plurality of side walls and a first pivotal attachment means. An outer side of the base portion includes at least one magnet and a configured to hold a support means. At least one of the pluralities of side walls recess includes a pair of side magnets. The speaker unit comprises a pair of lower magnets, a support means magnet, a second pivotal attachment means, a pair of speaker side magnets, a charging port, an ON/OFF button, an indicator, at least one flat panel speaker having at least one carbon fiber board excited by a mini exciter positioned inside the speaker unit and a microphone.

28 Claims, 24 Drawing Sheets

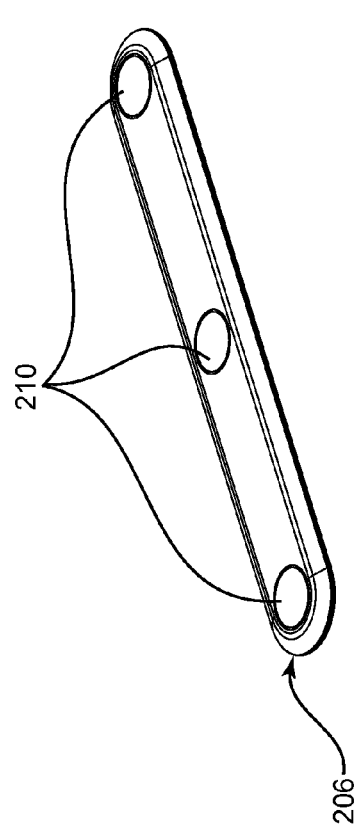
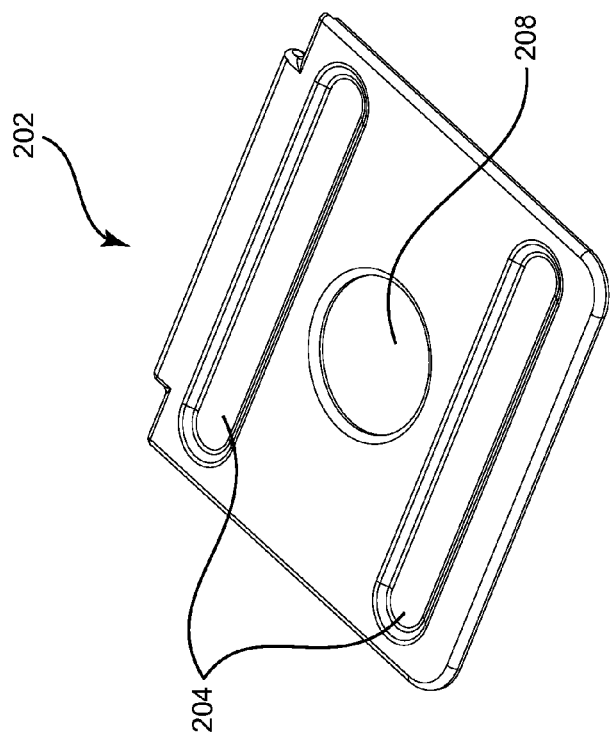
FIG. 6B
FIG. 6C
FIG. 6A

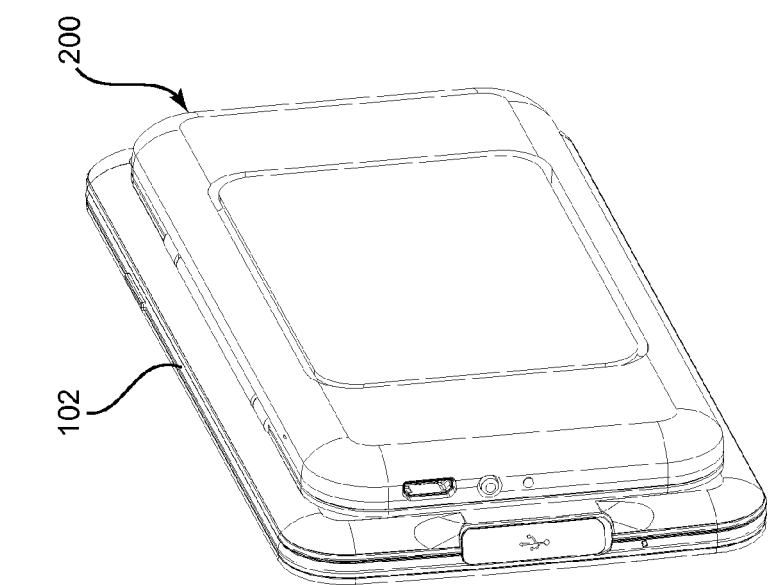
FIG. 8D
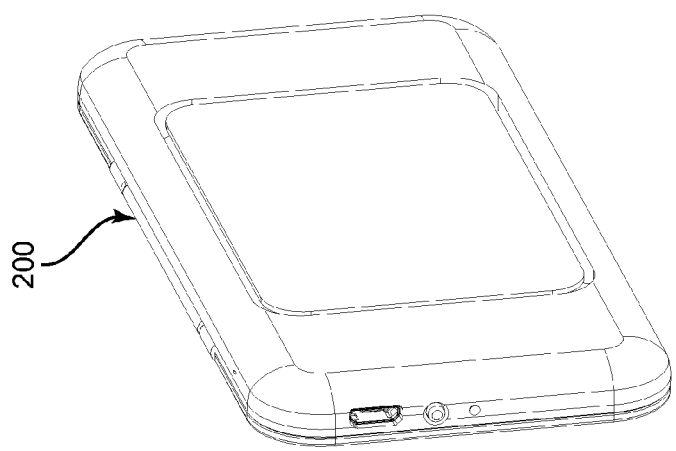
FIG. 8C
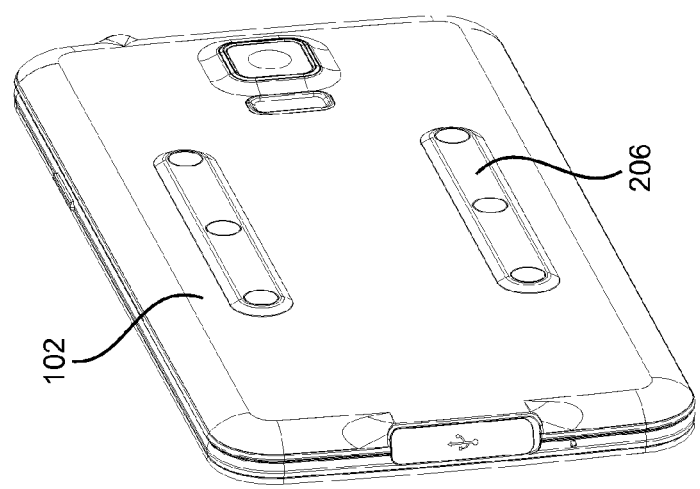

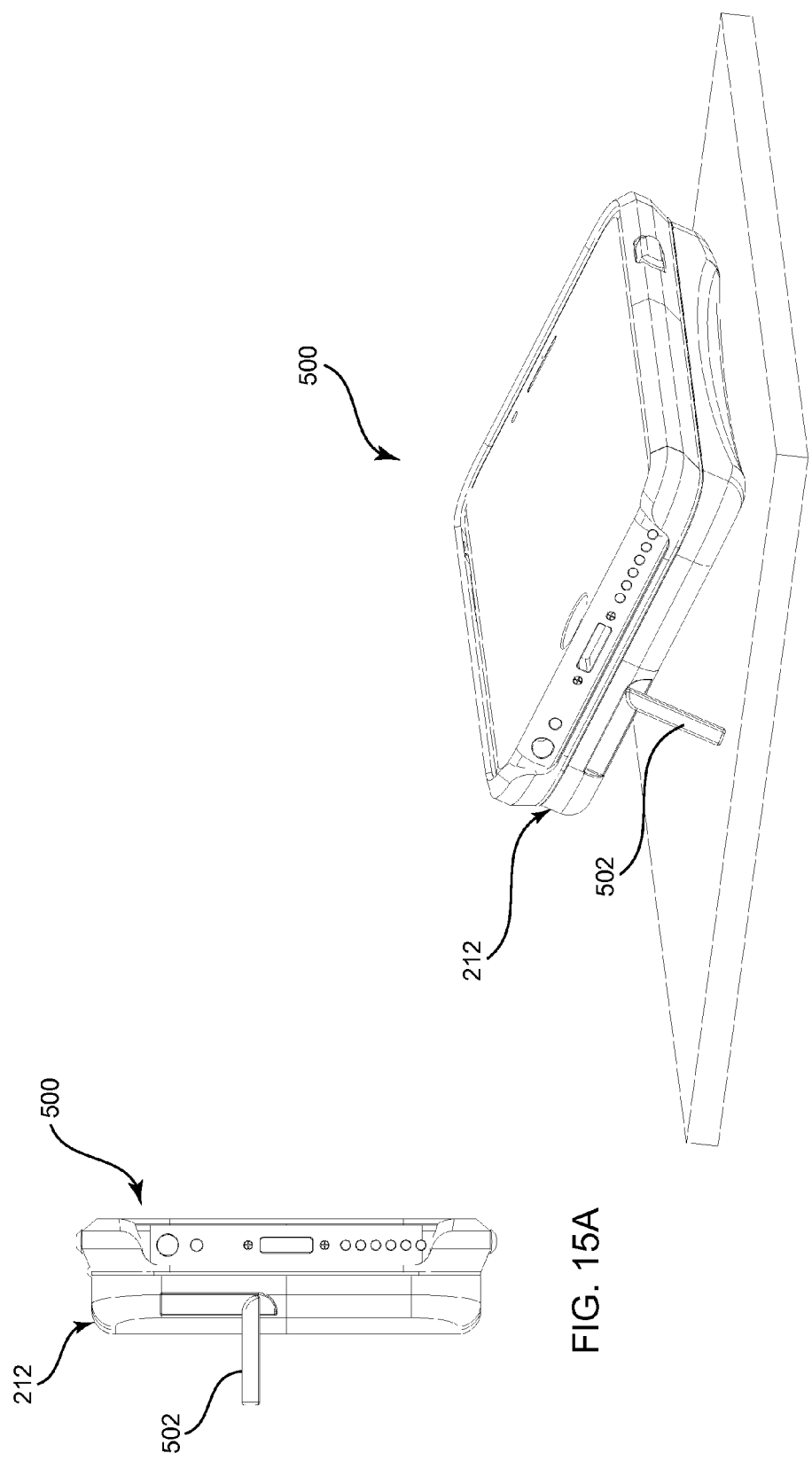

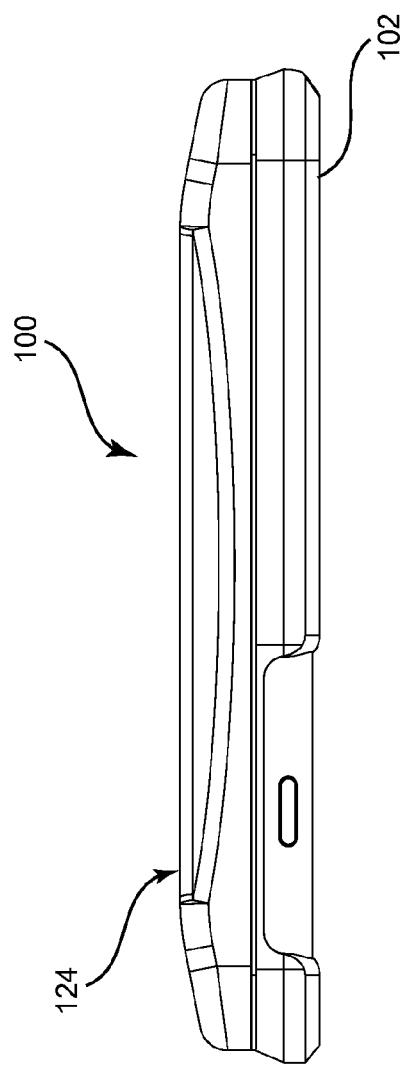
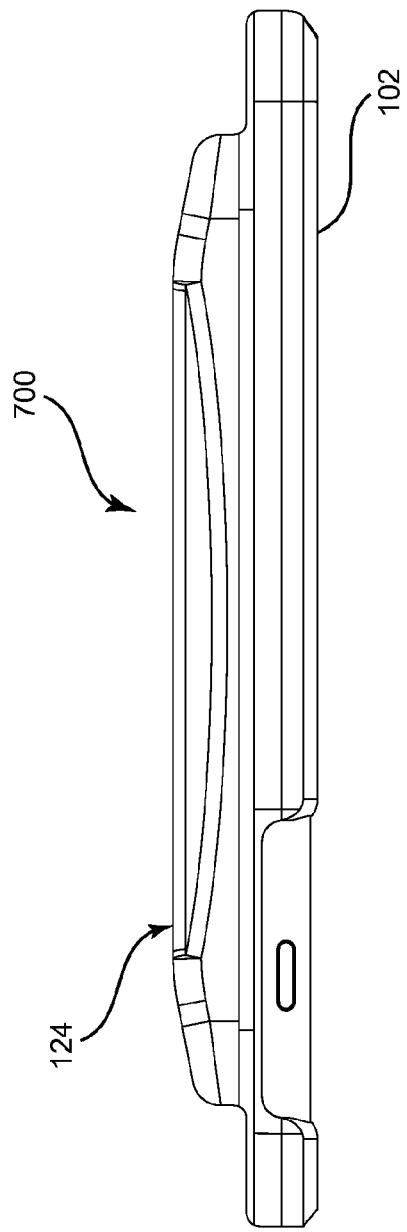
FIG. 17A
FIG. 17B

DEVICE ACCESSORY WITH SPEAKERS

RELATED APPLICATIONS

The application claims priority from the United States provisional application with Ser. No. 62/002,752 filed on May 23, 2014. The disclosure of that provisional applications is incorporated herein as if set out in full.

BACKGROUND OF THE DISCLOSURE

1. Technical Field of the Disclosure

The present embodiment relates in general to portable electronic device accessories. More specifically, the present disclosure relates to a portable electronic device accessory having multi-positioned stereo speakers along with the means to support the portable electronic device at convenient angles.

2. Description of the Related Art

There are many accessories marketed and sold for all brands and types of portable electronic devices. Many portable electronic devices available in the market usually have a single speaker design located on the rear side of the device. One major weakness of these portable electronic devices is the lack of robust sound reproduction, i.e. speakers capable of producing high quality and high volume sounds.

One conventional solution to the lack of robust sound reproduction capabilities is to employ a stand-alone speaker device with which the mobile device may communicate by wired or wireless means. The drawback of such a stand-alone speaker device is that it necessitates owning and transporting an additional device. Furthermore, most such devices are at least as large as the mobile device itself, if not quite a bit larger. Although larger devices can create deeper sound than smaller devices, there remains the downside that one must carry with oneself two devices rather than one.

At the same time, there are many cases marketed and sold for all brands and types of portable electronic devices. These cases are generally designed to protect the device and/or provide enhanced functionality. An additional weakness of many portable devices is that they do not have a built in means to support the device at a convenient angle for viewing the screen of the devices, when viewing media.

One of the existing portable electronic device accessories discloses a cell phone protective case, with an expander sound outlet located on the right and left sides and the bottom perimeters, of a cell phone. The frame interior comprises a circular throat member for sound impedance, matching to create an improved coupling effect between the original speaker, and the air. The frame interior comprises sectional chambers covering both the horizontal and vertical coverage axis to change the directional characteristics of sound waves to amplify and channel the sound towards the outer perimeters of the device. However, the frame interior with the sectional chamber directs the sound waves through the channel and produces a low quality amplified signal. Further, this frame interior does not have additional speakers to produce an enhanced quality of sound.

Another existing portable electronic device accessory discloses a mobile device protective case that facilitates the playback of audio via an imbedded speaker system. The protective case comprises a front portion, a rear portion secured thereto, TRS connector auxiliary (AUX) audio jack, a signal processing means, at least one speaker and a power source. The speaker, signal processing means and power source are housed within the rear portion of the case. Even though this protective case includes the speaker, this case does not provide any means to support the portable electronic device at convenient angles for viewing the screen, such as when viewing media on the device.

Various other portable electronic device accessories currently available do not provide device protection along with sound amplification and the means to view the device screen at convenient angles. One sound-amplifying case for a mobile device provides a sound guide groove under a portion of the body and opened over the speaker of the mobile device for guiding sound from the speaker toward the pop-up plate. The sound guide hole is provided through a portion of the base groove of the body exposing the speaker of the mobile device to the sound guide groove. Even though the case provides sound amplification, the case does not have the means to support the portable electronic device so that a user can view and listen to music without employing an ear phone or earbud.

Therefore, there is a need for a portable electronic device accessory that would provide a high quality and high volume sound. Such a device would have speakers employed to produce robust sound reproduction. Such a device would have built-in means to support the portable electronic device at different angles to view its screen. Such a needed device would snugly hold the portable electronic device and prevent it from falling. Such a device would be small in size and light weight. Such a device would be adaptable to use with a portable electronic device of any size. The present embodiment accomplishes these objectives.

SUMMARY OF THE DISCLOSURE

To minimize the limitations found in the prior art, and to minimize other limitations that will be apparent upon the reading of the specifications, preferred embodiment of the present invention provides a device accessory that emanates high quality high volume sound produced from a portable communication device and provides support means to support the portable communication device at convenient angles.

The device accessory comprises a clip case for holding the portable communication device and a speaker unit that provides high quality high volume sound produced from the mobile device. The clip case is configured to snugly hold or attach to any currently known or future mobile device by modifying the shape and size of the clip case as is known in the art. The clip case further comprises a base portion attached to a plurality of side walls to hold the mobile device snugly and to prevent the mobile device from sliding off the clip case and a first pivotal attachment means. An outer side of the base portion includes at least one magnet and a recess configured to hold a support means. The support means is pivotally connected to the clip case by means of the first pivotal attachment means. At least one of the pluralities of side walls includes a pair of side magnets. Both the base portion and the plurality of side walls include a plurality of cutouts.

The speaker unit comprises a pair of lower magnets, a support stand magnet, a second pivotal attachment means, a pair of speaker side magnets, a charging port, an ON/OFF button, an indicator, at least one flat panel speaker having at least one carbon fiber board excited by a mini exciter positioned inside the speaker unit and a microphone. The speaker unit of the device accessory is configured to attach to the portable communication device via the clip case. The speaker unit further includes a plurality of cutouts configured to match any specific mobile device. The at least one magnet on the outer side of the clip case hold the speaker unit in place when the speaker unit and the clip case are in their most compact configuration. The microphone allows the speaker unit to be used as a speakerphone when connected wirelessly or via a wire to the mobile device. The clip case and the speaker unit are pivotally connected by means of the first pivotal attachment means and the second pivotal attachment means to form a most compact, folded configuration. The pivotal connection between the clip case and the speaker unit allows the present invention to form an angle between 0 degrees and 180 degrees between the clip case and the speaker unit. The pivotal connection allows three default angle configurations. They are 0 degrees, approximately 30 degrees and approximately 180 degrees. When the pivotal connection is at 0 degrees, the attraction between the pair of lower magnets and the at least one magnet keeps the device accessory in the most compact configuration. The support means pivotal connection is configured such that the support means cannot pivot more than approximately 30 degrees away from the clip case.

It is a first objective of the present invention to provide a device accessory that would emanate a high quality and high volume sound produced from the portable communication device.

A second objective of the present invention is to provide a device accessory that would employ speakers to produce robust sound reproduction.

A third objective of the present invention is to provide a device accessory that has built-in means to support the portable communication device at different angles to view its screen.

A fourth objective of the present invention is to provide a device accessory that would snugly hold the portable electronic device and prevent it from falling.

Another objective of the present invention is to provide a device accessory that would be small in size and light weight.

Yet another objective of the present invention is to provide a device accessory that would be adaptable to use with a portable electronic device of any size.

These and other advantages and features of the present invention are described with specificity so as to make the present invention understandable to one of ordinary skill in the art.

BRIEF DESCRIPTION OF THE DRAWINGS

Elements in the figures have not necessarily been drawn to scale in order to enhance their clarity and improve understanding of these various elements and embodiments of the invention. Furthermore, elements that are known to be common and well understood to those in the industry are not depicted in order to provide a clear view of the various embodiments of the invention, thus the drawings are generalized in form in the interest of clarity and conciseness.

FIG. 6A illustrates a perspective view of a clip case of the device accessory in accordance with one embodiment of the present invention;

FIG. 6B illustrates a front perspective view of an attachment means of the clip case of the device accessory in accordance with one embodiment of the present invention;

FIG. 6C illustrates a rear perspective view of the attachment means of the clip case of the device accessory in accordance with one embodiment of the present invention;

FIG. 8C illustrates a rear perspective view of the portable communication device attached with the attachment means and the speaker unit in accordance with one embodiment of the present invention;

FIG. 8D illustrates a rear perspective view of the device accessory holding the portable communication device via the attachment means in accordance with one embodiment of the present invention;

FIG. 15A illustrates a top view of a device accessory having at least a pair of flip out support means in accordance with one embodiment of the present invention;

FIG. 15B illustrates a front perspective view of the device accessory having at least a pair of flip out support means in accordance with one embodiment of the present invention in use;

FIG. 17A illustrates a side view of the device accessory holding the mobile phone in accordance with the preferred embodiment of the present invention;

FIG. 17B illustrates a side view of a universal device accessory holding the mobile phone in accordance with one embodiment of the present invention

DETAILED DESCRIPTION OF THE DRAWINGS

In the following discussion that addresses a number of embodiments and applications of the present invention, reference is made to the accompanying drawings that form a part hereof, and in which is shown by way of illustration specific embodiments in which the invention may be practiced. It is to be understood that other embodiments may be utilized and changes may be made without departing from the scope of the present invention.

Various inventive features are described below that can each be used independently of one another or in combination with other features. However, any single inventive feature may not address any of the problems discussed above or only address one of the problems discussed above. Further, one or more of the problems discussed above may not be fully addressed by any of the features described below.

The present invention provides a device accessory 100 having multi-positioned stereo speakers and support means to support a portable communication device 102 at convenient angles. The device accessory 100 emanates high quality high volume sound produced from the portable communication device 102 and supports the portable communication device 102 at convenient angles for viewing the screen.

Figure 1:
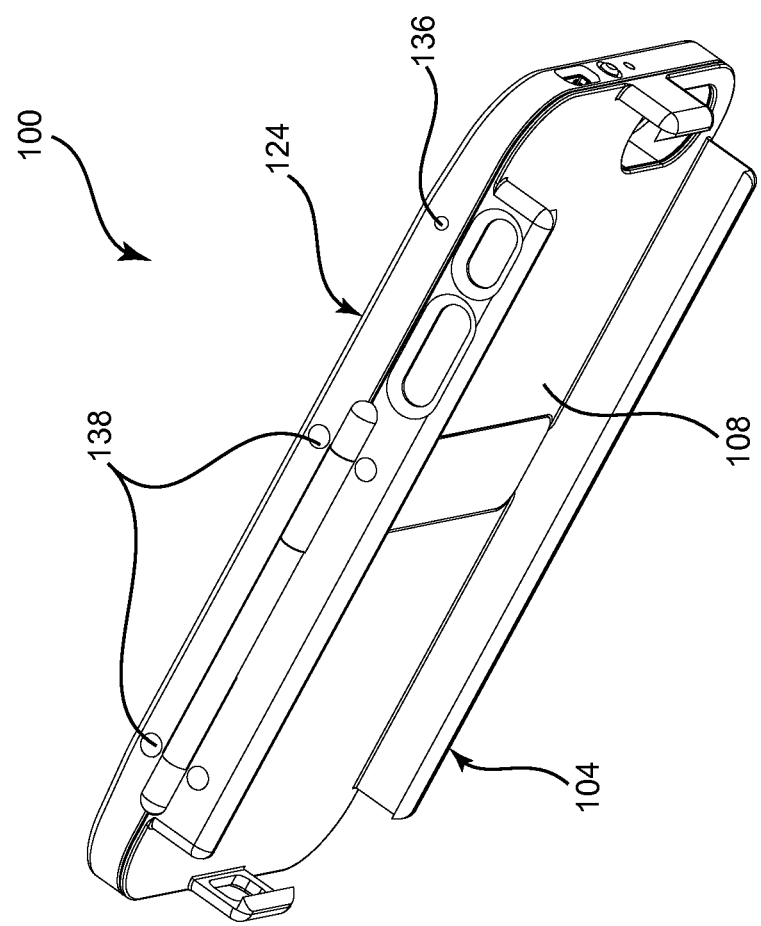
FIG. 1 illustrates a perspective view of a device accessory in accordance with the preferred embodiment of the present invention.

Turning to FIG. 1, a perspective view of a device accessory 100 in accordance with the preferred embodiment of the present invention is illustrated. The device accessory 100 comprises a clip case 104 for holding the portable communication device, preferably a mobile phone 102 (see FIG. 4A), and a speaker unit 124 adaptable to attach with the clip case 104. The clip case 104 and the speaker unit 124 are pivotally connected to one another to form a most compact folded configuration as shown in FIG. 1.

Figure 2A:
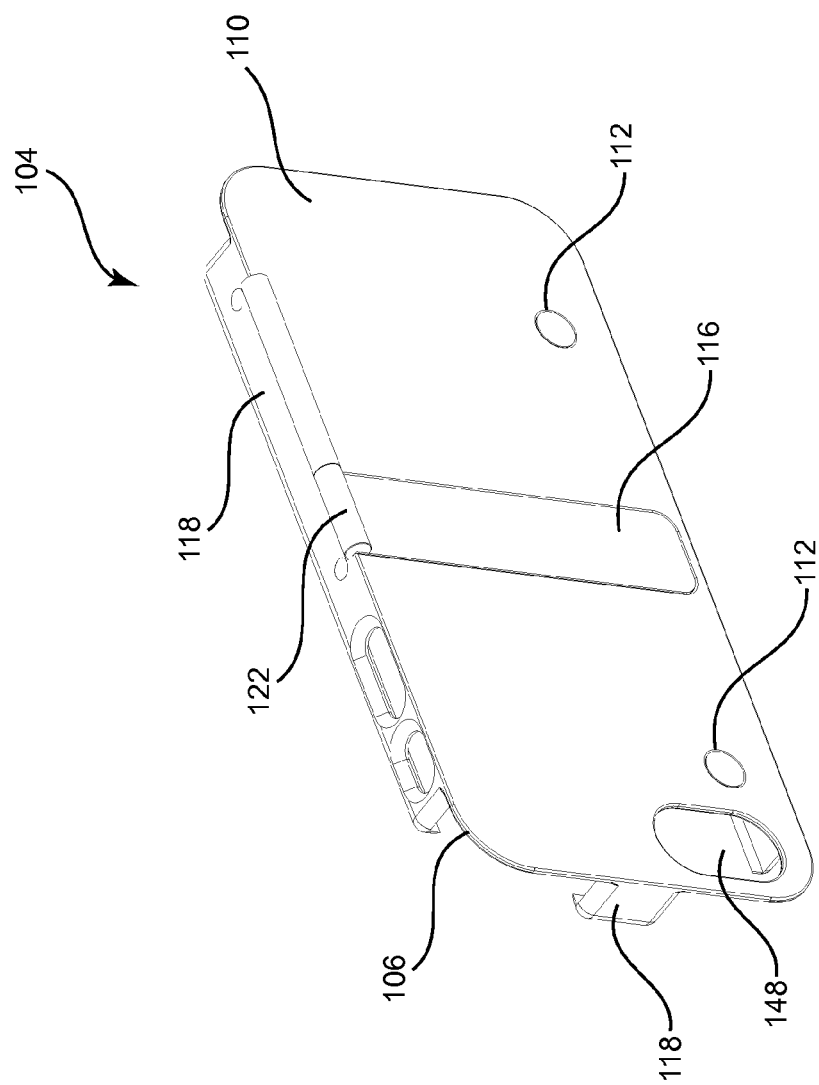
FIG. 2A illustrates a perspective view of a clip case of the device accessory in accordance with the preferred embodiment of the present invention.
Figure 2B:
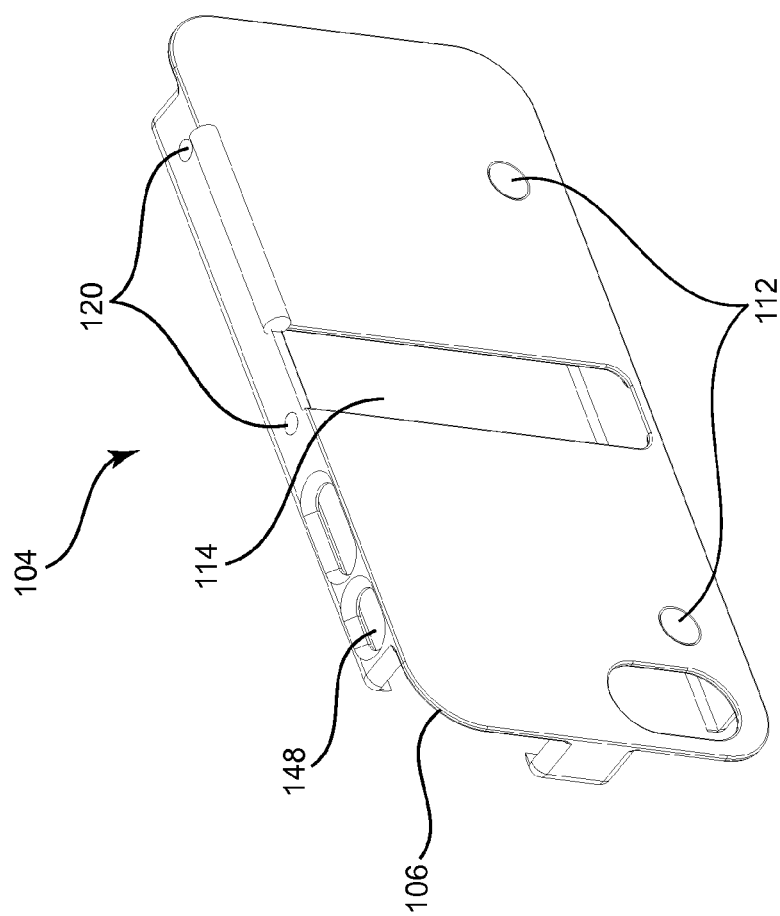
FIG. 2B illustrates a perspective view of the clip case without a support means in accordance with the preferred embodiment of the present invention.

FIGS. 2A-2B, illustrate a perspective view of the clip case 104 of the device accessory 100 in accordance with the preferred embodiment of the present invention. The clip case 104 is configured to snugly hold any currently known portable communication device, preferably the mobile phone 102 (see FIG. 4A), or future mobile phone by modifying the shape and size of the clip case 104 as is known in the art. The clip case 104 is made from a material selected from a group consisting of: plastic, metal, rubber, acrylic, glass, or other materials known in the art of mobile device cases. In accordance with standard mobile device cases, the clip case 104 of the present invention provide protection to the mobile phone 102 (see FIG. 4A), from dirt, abrasion, impact, moisture, and other elements that may harm or damage the mobile phone 102 (see FIG. 4A).

The clip case 104 further comprises a base portion 106 having an inner side 108 (see FIG. 1) and an outer side 110, a plurality of side walls 118 attached to the base portion 106, and a first pivotal attachment means 122. The inner side 108 (see FIG. 1) of the base portion 106 is adaptable to receive the mobile phone 102. The outer side 110 includes at least two magnets 112 and a recess 114 as shown in FIG. 2B, configured to hold a support means 116. The at least two magnets 112 is preferably made from neodymium, and can be disc shaped. In one embodiment the at least two magnets 112 are approximately 6.35 mm in diameter. In other embodiments, the at least two magnets 112 may comprise any magnetic substance or substance that is attracted by magnets, such as metal. In other embodiments the at least two magnets 112 may be of any size or shape, including non-circular shapes. The support means 116 is configured to orient the mobile phone 102 (see FIG. 4A), at a plurality of angular positions. In FIG. 2A, the support means 116 is shown in a fully retracted position. The support means 116 preferably is made from a lightweight metal, but in alternative embodiments it can be made from any strong rigid material including but not limited to plastic, composite, metal, ceramic, or other materials known in the art. The plurality of side walls 118 snugly hold the portable communication device preferably the mobile phone 102 and prevent it from sliding off the clip case 104. A pair of side magnets 120 is present on at least one of the plurality of side walls 118 as shown in FIG. 2B. The first pivotal attachment means 122 is attached to the base portion 106 which pivotally connects the support means 116 to the base portion 106 such that the support means 116 pivots about an axis parallel to the long axis of the mobile phone 102 proximate to the first pivotal attachment means 122. In alternative embodiments the support means 116 may be pivotally connected to the clip case 104 about a different axis or at a different location. The support means 116 is retracted into the recess 114. In alternative embodiments the support means 116 may be of different dimensions and shape. A hinge may be utilized to provide the pivot action such as the standard hinge shown or a living hinge (not shown). The clip case 104 may further comprise a plurality of cutouts 148 configured to match a specific mobile phone 102.

Figure 3B:
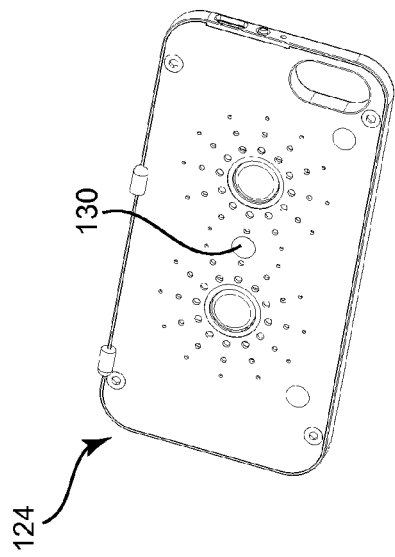
FIG. 3B illustrates a front perspective view of the speaker unit with at least one support means magnet positioned at the center of the speaker unit in accordance with the preferred embodiment of the present invention.
Figure 3C:
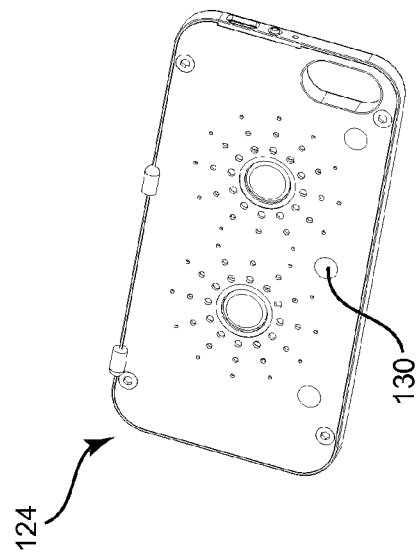
FIG. 3C illustrates a front perspective view of the speaker unit with at least one support means magnet positioned near a pair of lower magnets in accordance with the preferred embodiment of the present invention.
Figure 3A:
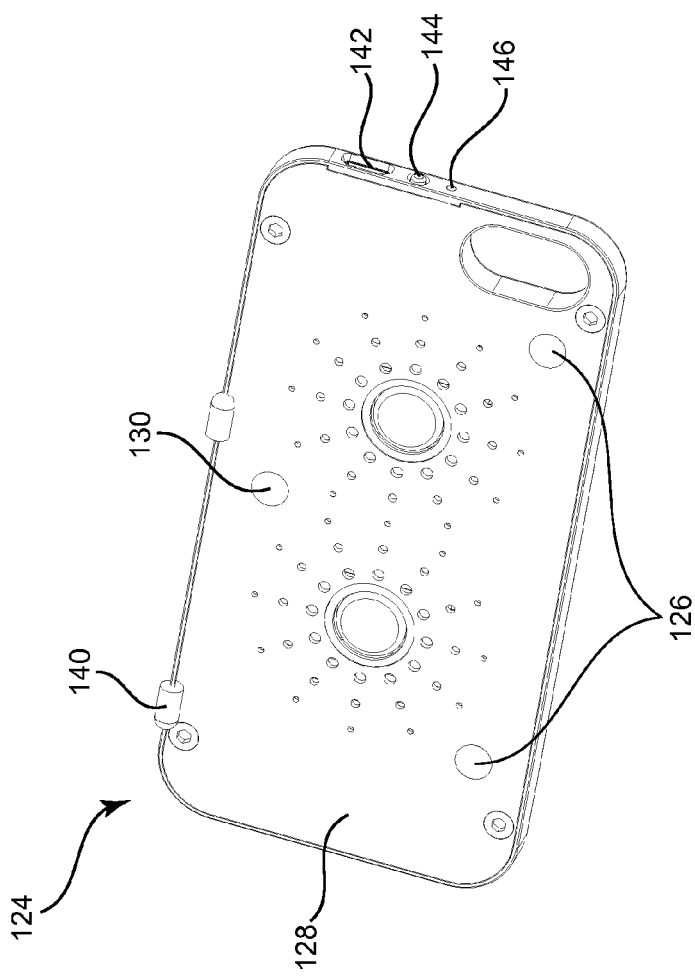
FIG. 3A illustrates a front perspective view of a speaker unit of the device accessory in accordance with the preferred embodiment of the present invention.

FIGS. 3A-3C illustrate a front perspective views of the speaker unit 124 of the device accessory 100 in accordance with the preferred embodiment of the present invention. The speaker unit 124 is adaptable to attach with the clip case 104 to form the device accessory 100. The speaker unit 124 comprises a pair of lower magnets 126 positioned on a front surface 128, a support means magnet 130, at least one flat panel speaker 132 (see FIG. 4B), excited by at least one mini exciter (not shown) or conventional speaker, a microphone 136 (see FIG. 1), a pair of speaker side magnets 138 (see FIG. 1), a second pivotal attachment means 140, a charging port 142 configured to charge the speaker unit 124, an ON/OFF button 144 and an indicator 146. The pair of lower magnets 126 positioned on the front surface 128 is proximate to the at least two magnets 112 on the base portion 106 of the clip case 104 when the device accessory 100 is in the compact folded configuration. The support means magnet 130 is configured to pull the support means 116 from the recess 114 to a pivotal connection angle. The pivotal connection angle limit of the support means 116 is 30 degrees approximately. The pair of lower magnets 126 and the support means magnet 130 are rare earth magnets, preferably comprising neodymium in the shape of discs. In one embodiment the pair of lower magnets 126 and the support means magnets 130 are approximately 6.35 mm in diameter. In other embodiments these magnets can be of any size or shape, including non-circular shapes. In other embodiments the speaker unit 124 can have one or more than two lower magnets 126. In some other embodiments the pair of lower magnets 126 can be metallic elements that are attracted to magnets. When the clip case 104 and the speaker unit 124 are in the compact configuration, the attraction between the pair of lower magnets 126 and the support means magnet 130 acts to keep the clip case 104 and the speaker unit 124 in the compact, folded configuration.

In other embodiments, the support means magnet 130 can be located in the middle of the speaker unit 124 as illustrated in FIG. 3B or on the edge of the speaker unit 124 as the pair of lower magnets 126 is positioned as illustrated in FIG. 3C.

Figure 4B:
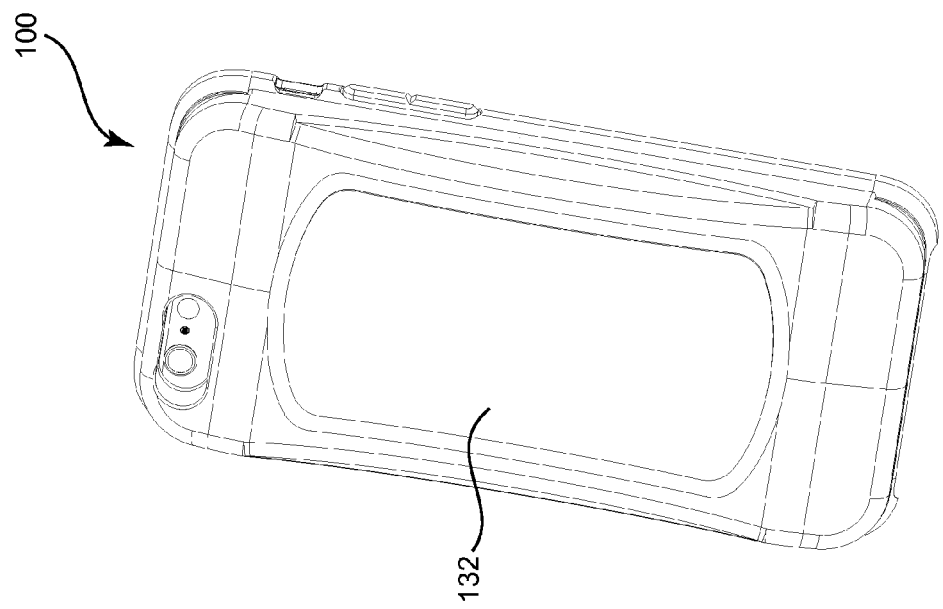
FIG. 4B illustrates a rear perspective view of the device accessory in a folded configuration in accordance with the preferred embodiment of the present invention.
Figure 4A:
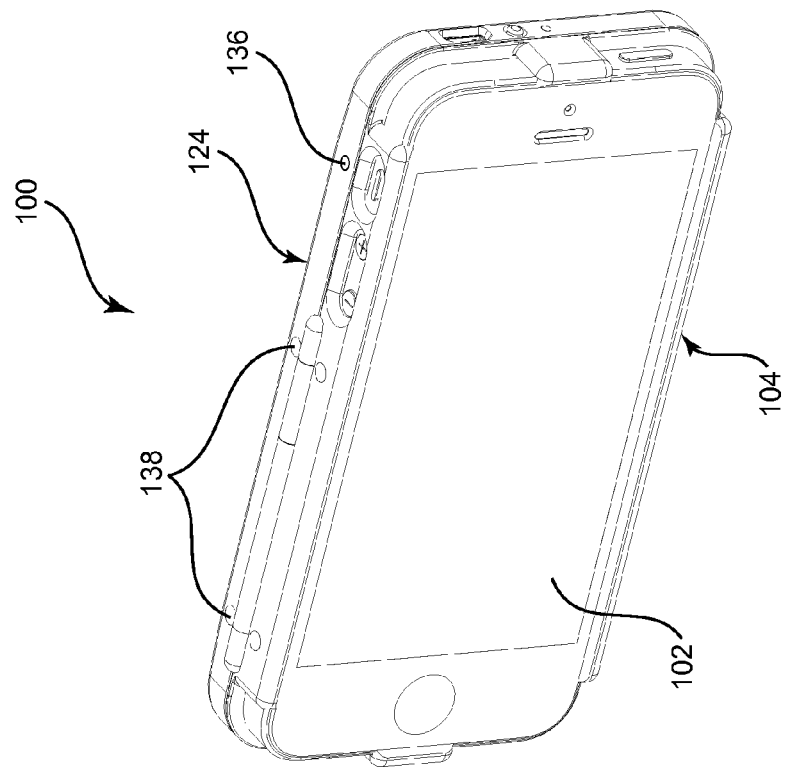
FIG. 4A illustrates a front perspective view of the device accessory holding a portable communication device in a folded configuration in accordance with the preferred embodiment of the present invention.

FIGS. 4A-4B illustrates a front perspective view and a rear perspective view respectively of the device accessory 100 holding the mobile phone 102 in a folded configuration in accordance with the preferred embodiment of the present invention. The clip case 104 and the speaker unit 124 are pivotally connected to one another and in their most compact folded configuration holding the mobile phone 102. The at least one flat panel speaker 132 as shown in FIG. 4B, includes at least one carbon fiber board (not shown) excited by at least one mini exciter (not shown) inside the speaker unit 124. Preferably the carbon fiber board(s) is between 0.25 mm and 0.50 mm thick, but in alternative embodiments may be as thin as 0.01 mm or as thick as 3 mm. In alternative embodiments any slightly flexible, light material known in the art may be substituted for the carbon fiber including but not limited to plastic, fiber, paper, composites, cardboard, metal, etc. In some embodiments the at least one carbon fiber board (not shown) is surrounded by a rubber roll gasket which allows the board to move freely and produce high quality sound. The rubber roll gasket (not shown) may comprise rubber, silicone, or any other material known in the art.

Figure 5B:
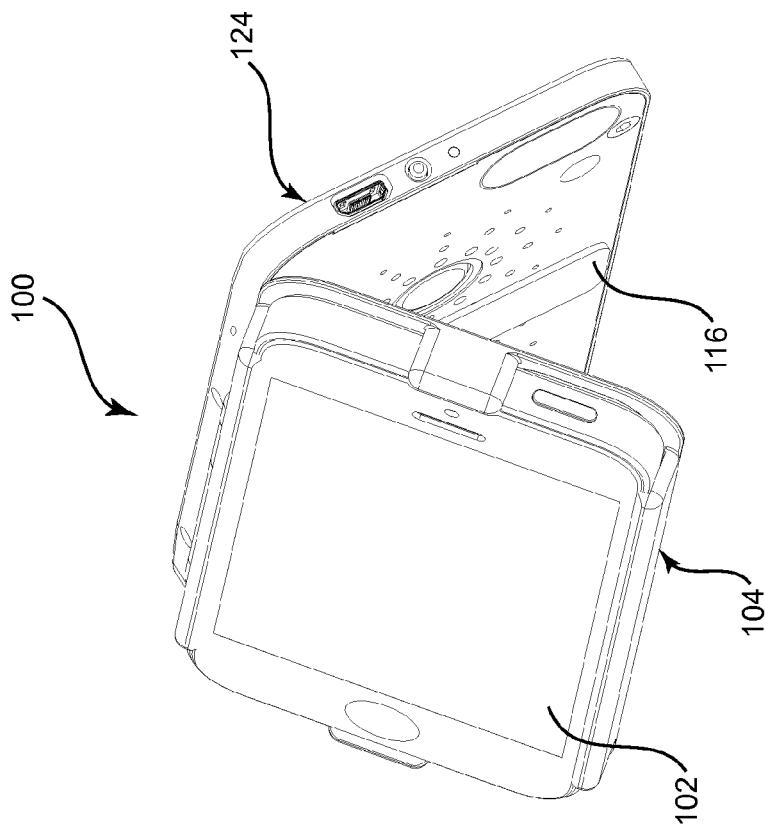
FIG. 5B illustrates a front perspective view of the device accessory holding the portable communication device in a default angle configuration of 30 degrees approximately in accordance with the preferred embodiment of the present invention.
Figure 5A:
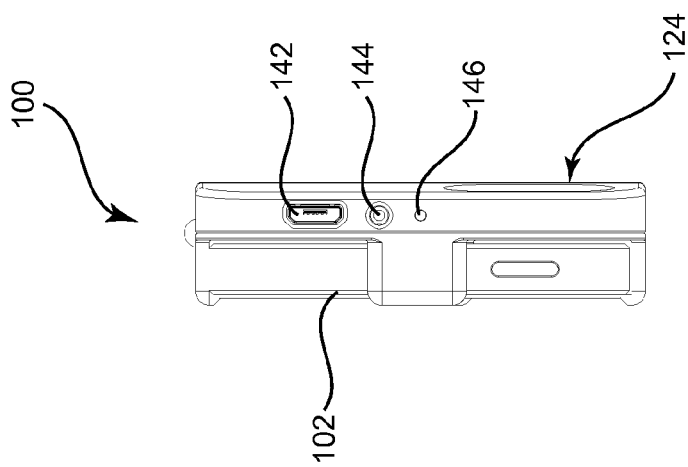
FIG. 5A illustrates a top view of the device accessory holding the portable communication device in accordance with the preferred embodiment of the present invention.

FIG. 5A illustrates a top view of the device accessory 100 holding the mobile phone 102 in accordance with the preferred embodiment of the present invention. The charging port 142 of the speaker unit 124 can additionally function as an audio input/output port. In the present embodiment the charging port 142 is a mini-USB port, but in alternative embodiments the charging port 142 may be any known in the art or may be replaced entirely or augmented by an inductive charging system. The indicator 146 can preferably be one LED configured to indicate ready to pair, paired and on, off, low battery, etc. In alternative embodiments the device accessory 100 may also or alternatively deliver status messages audibly. The ON/OFF button 144 is configured to turn the device accessory 100 ON and OFF as well as activate pairing mode or control volume.

Figure 5D:
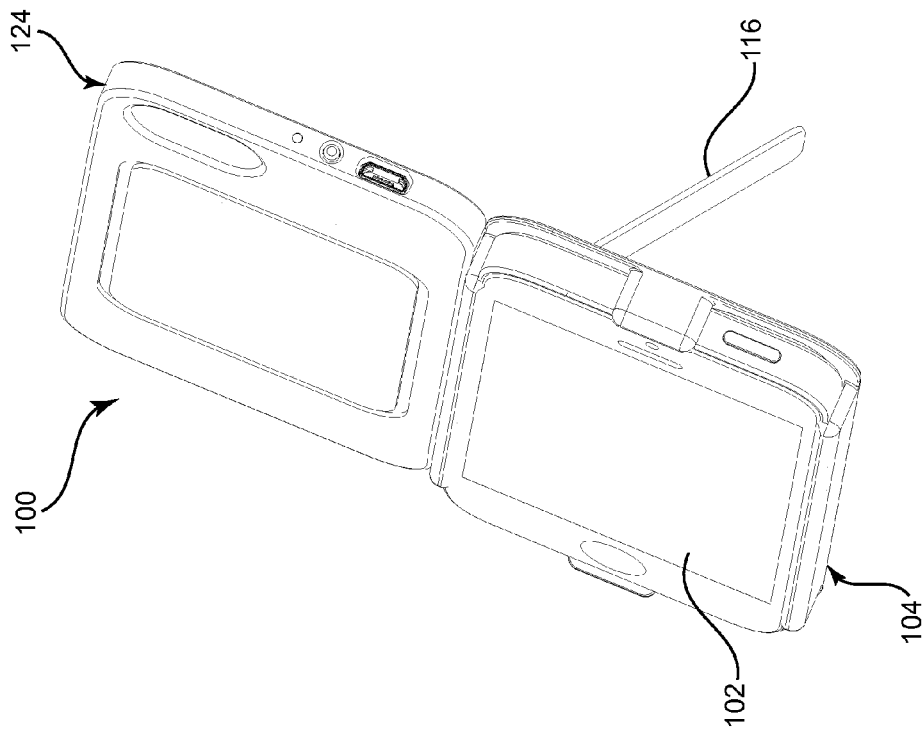
FIG. 5D illustrates a front perspective view of the device accessory holding the portable communication device in a default angle configuration of 180 degrees approximately in accordance with the preferred embodiment of the present invention.
Figure 5C:
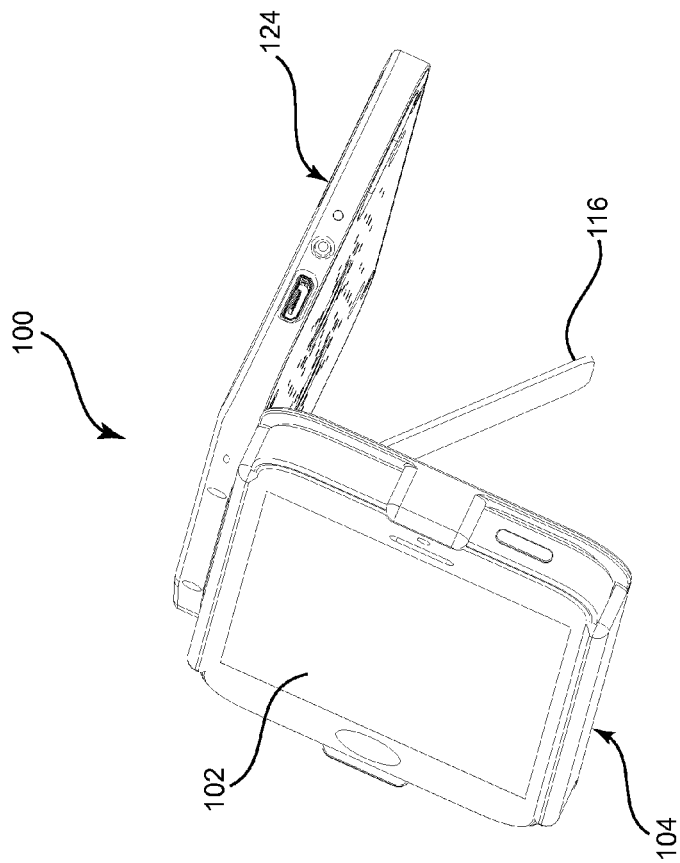
FIG. 5C illustrates a front perspective view of the device accessory holding the portable communication device in an angle configuration between 30 degrees and 180 degrees approximately in accordance with the preferred embodiment of the present invention.

Referring to FIGS. 5B through 5D, a front perspective view of the device accessory 100 holding the mobile phone 102 in different default angle configurations are illustrated in accordance with the preferred embodiment of the present invention. The pivotal connection between the clip case 104 and the speaker unit 124 allows an orientation from zero degree to 180 degrees between the clip case 104 and the speaker unit 124 in unfolded configuration. The first pivotal attachment means 122 provides the speaker unit 124 with default angle configurations selected from a group consisting of: 0 degree, 30 degrees and 180 degrees. When the pivotal connection is at 0 degrees, the angle is maintained by the attraction between the pair of lower magnets 126 and the at least two magnets 112.

The device accessory 100 as illustrated in FIG. 5B is at an angle configuration of approximately 30 degrees. The pivotal connection angle limit of the support means 116 is 30 degrees approximately and cannot pivot more than approximately 30 degrees away from the clip case 104. The support means magnet 130 pulls the support means 116 out away from the clip case 104 until the support means 116 encounters its pivotal connection angle limit. This pivotal angle limitation may be accomplished by any means known in the art including but not limited to a mechanical stop. In this configuration the device accessory 100 holding the mobile phone 102 can be placed on a flat surface and will provide a comfortable viewing angle for a user of the mobile phone 102 while providing high quality sound via the speaker unit 124. The support means magnet 130 pulls the support means 116 with more or less torque depending upon the position of the support means magnet 130 on the speaker unit 124. As the support means 116 is preferably made of very light metal, it does not require large amount of torque to pivot it about first pivotal attachment means 122.

In use, the support means 116 pivots with the speaker unit 124 until it reaches its maximum angle configuration, and then the mechanical force of rotating the speaker unit 124 further separates the speaker unit 124 from the support means 116, leaving the support means 116 at its maximum pivotal angle of approximately 30 degrees, or at a predefined convenient angle at which to support the mobile phone 102 for convenient viewing. This movement of the support means 116 requires no thought on the part of the user beyond simply pivoting the speaker unit 124 away from the device accessory 100.

In alternative embodiments the support means magnet 130 may be omitted and the same user experience as described above may be accomplished by non-magnetic means such as but not limited to a hinge with mechanical detents, a friction hinge configured such that the support means 116 and the speaker unit 124 can be set at any position relative to the device accessory 100, either together or individually or a combination of a friction hinge and mechanical detents.

When the support means 116 encounters its pivotal connection angle limit of approximately 30 degrees, it stops pivoting further. At this point the support means magnet 130 is no longer in contact with the support means 116. The speaker unit 124 may continue to pivot about the first pivotal attachment means 122 all the way to 180 degrees as shown in FIG. 5C.

The speaker unit 124 and the clip case 104 are pivoted to a maximum angle of 180 degrees rotated about the first pivotal attachment means 122 as shown in FIG. 5D. In this position the pair of side magnets 120 and the pair of speaker side magnets 138 attracts each other and act to hold the speaker unit 124 and clip case 104 in static relative position to hold the device accessory 100 in a fully open position. In this configuration the device accessory 100 holding the mobile phone 102 can be placed on a flat surface and the support means 116 holds the device accessory 100 with the mobile phone 102 at a convenient viewing angle while projecting high quality and high volume sound.

As will be appreciated, when the user returns the device accessory 100 to its 0-degree configuration, or in other words, folds it up, the speaker unit 124 effectively pushes the support means 116 back into the recess 114 in the clip case 104. The present embodiment of the device accessory 100 is generally adapted to use with mobile phones which are approximately the same size as the accessory. There exists any number of mobile phones for which the clip case 104 is not practical or not desirable for any number of reasons including consumer preference.

Figure 6D:
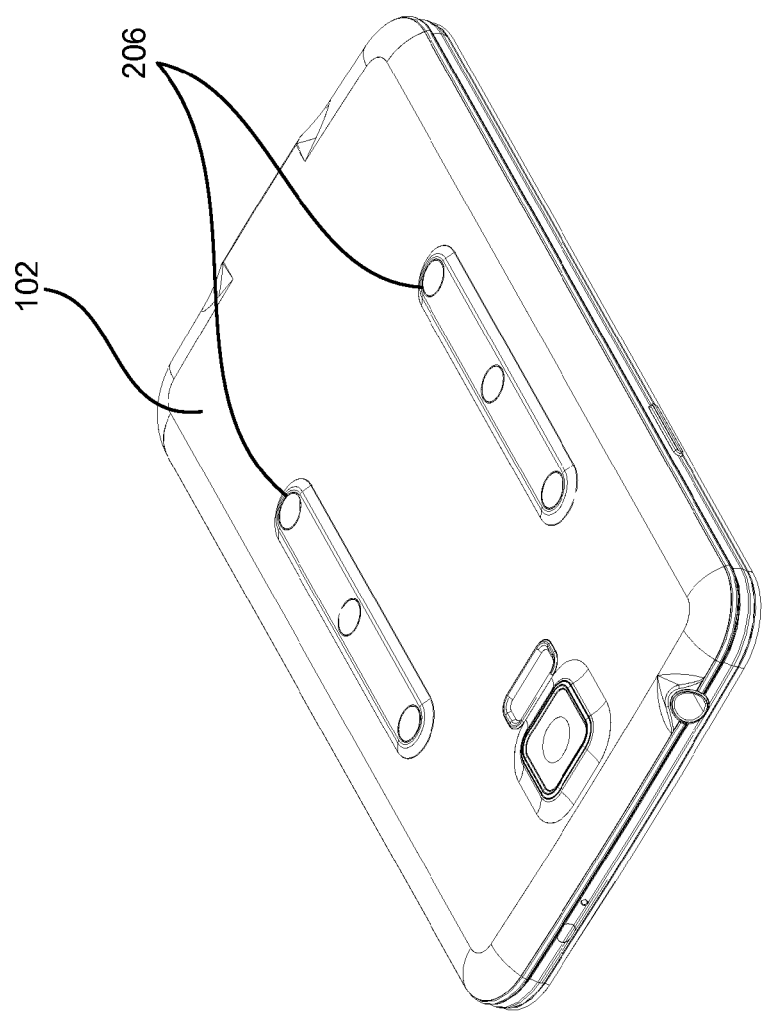
FIG. 6D illustrates a perspective view of the attachment means attached to the rear surface of the portable communication device in accordance with one embodiment of the present invention.
Figure 7:
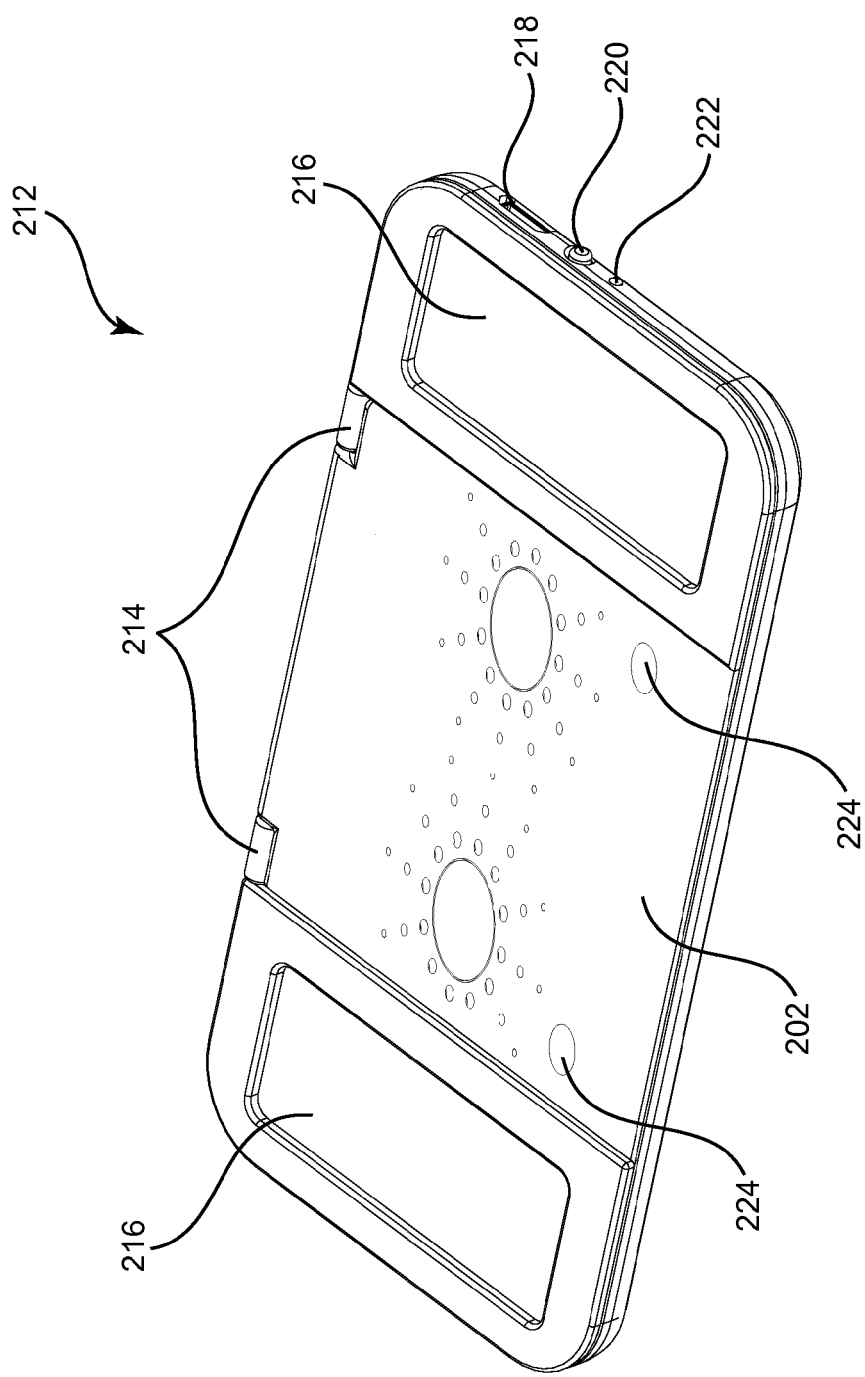
FIG. 7 illustrates a perspective view of the speaker unit in accordance with one embodiment of the present invention.

Turning to FIG. 6A through FIG. 10, the perspective views of a device accessory 200 in accordance with one embodiment of the present invention is illustrated. The device accessory 200 (see FIG. 8A) comprises a clip case 202 having a flat surface as shown in FIG. 6A and a speaker unit 212 as shown in FIG. 7. The clip case 202 is attached to the speaker unit 212 by a pivotal attachment means 214 (see FIG. 7). The clip case 202 is adaptable to use with the mobile phone 102 of any shape. The clip case 202 includes at least one recess 204 configured to interface with at least one attachment means 206 holding at least one magnet 210.

Preferably the clip case 202 is formed from thin metal, but in some embodiments may comprise any appropriate material known in the art such as thick metal, plastic, ceramic, composite, or any combination thereof. In one embodiment the clip case 202 includes a slot 208 configured such that the clip case 202 does not obstruct a camera integrated into the center of the mobile phone 102. In one embodiment, the clip case 202 can have preferably two recesses configured to interface with the at least one attachment means 206. The at least one attachment means 206 illustrated in FIG. 6B is generally smooth so as to be easily attachable to the mobile phone 102. The at least one attachment means 206 is preferably 1 mm thick made from rubber. In alternative embodiments the at least one attachment means 206 may be thinner or thicker than 1 mm and comprise any shapeable material including but not limited to rubber, plastic, composite, ceramic, and metal. Each of the at least one attachment means 206 comprise at least one magnet 210. In other embodiment, each of the at least one attachment means 206 can have one, two, or more than three magnets. The at least one magnet 210 preferably comprise rare earth magnets, such as neodymium. In alternative embodiments the magnets can be of any magnetic substance and may be of any shape or size. The back side of each of the at least one attachment means 206 as shown in FIG. 6C is generally smooth so as to be easily attachable to the mobile phone 102, but in alternative embodiments it may be shaped to match the shape of a particular mobile phone 102. The at least one attachment means 206 can be attached to the mobile phone 102 as shown in FIG. 6D by any means known in the art including pressure sensitive tape, glue, and adhesives. The at least one attachment means 206, in addition to mating with the clip case 202, provides added protection to the mobile phone 102.

The speaker unit 212 of the present embodiment comprises at least one speaker recess 216, a charging port 218 configured to charge the speaker unit 212, an ON/OFF button 220 and an indicator 222 as shown in FIG. 8. In one embodiment the speaker unit 212 can have two recesses, configured so as to not impinge on any camera protrusions or other protrusions that may be present on the mobile phone 102. The precise shape, size, and number of recesses may be adapted to conform to any known or future mobile phone, or to multiple mobile phones.

In some embodiments the charging port 218 is a mini-USB port, but in alternative embodiments the port may be any known in the art, or may be replaced entirely or augmented by an inductive charging system. In some embodiments the indicator 222 is configured to indicate ready to pair, paired and on, off, low battery, etc. In alternative embodiments the speaker unit 212 may also or alternatively deliver status messages audibly. In some embodiments the ON/OFF button 220 is configured to turn the device on and off as well as activate pairing mode.

Figure 8A:
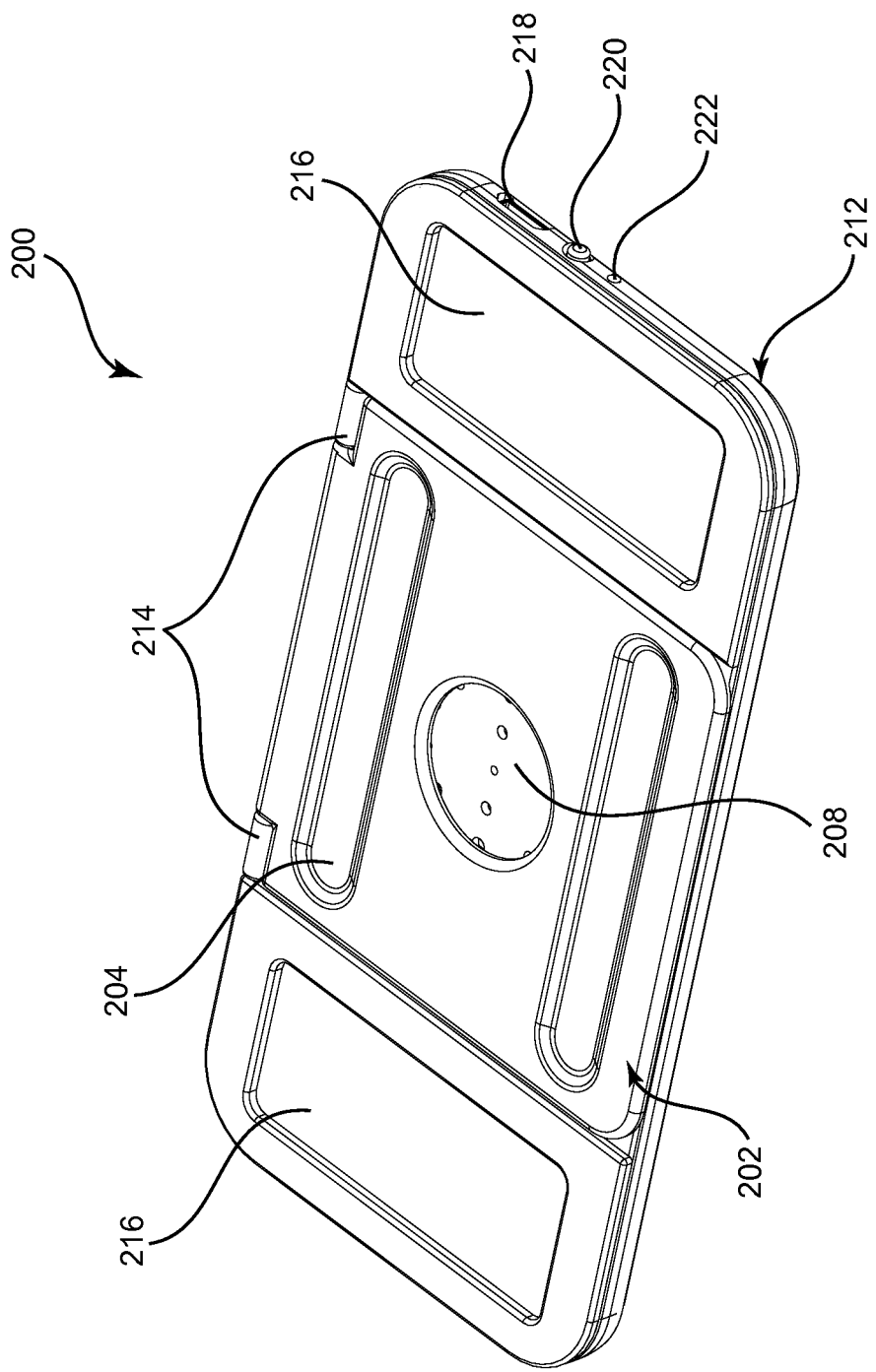
FIG. 8A illustrates a perspective view of a device accessory in accordance with one embodiment of the present invention.
Figure 8B:
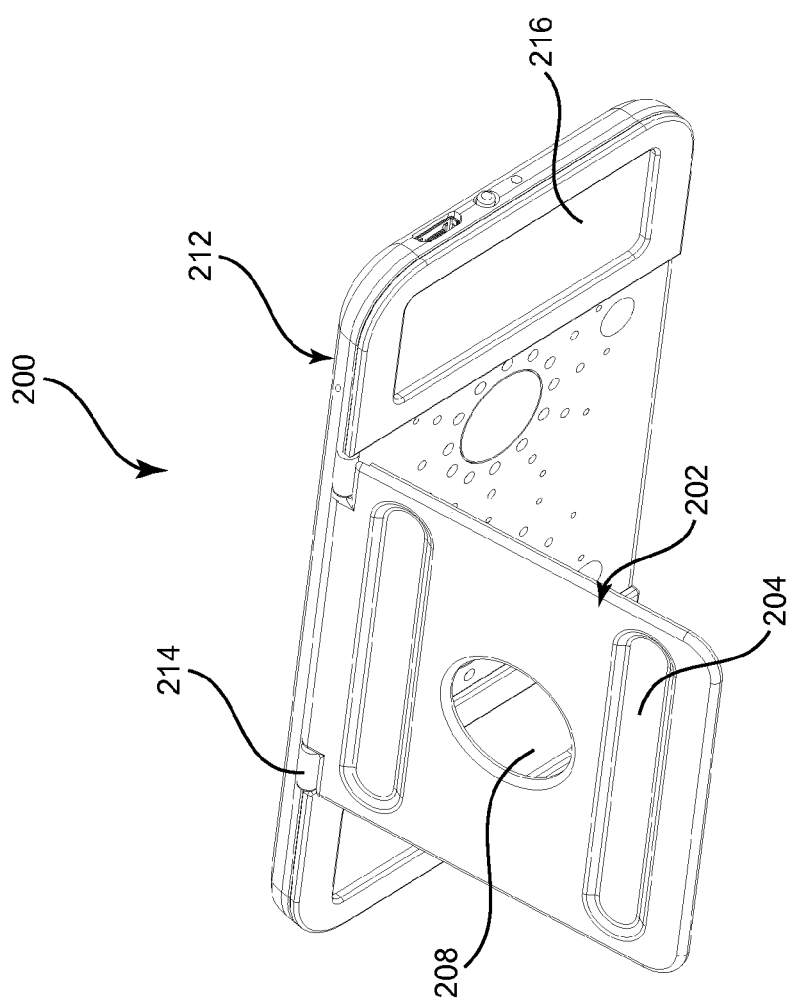
FIG. 8B illustrates a perspective view of the device accessory in an unfolded configuration in accordance with one embodiment of the present invention.

The clip case 202 is attached to the speaker unit 212 by the pivotal attachment means 214 as illustrated in FIG. 8A. The pivotal attachment means 214 allows the clip case 202 to pivot relative to the speaker unit 212 about an axis parallel to the long axis of the speaker unit 212 that is proximate to the edge of the speaker unit 212. In alternative embodiment the clip case 202 can pivot about a different axis or a different location on the speaker unit 212. The device accessory 200 of the present embodiment, can be used as a stand-alone speaker when not attached to any mobile phone as illustrated in FIG. 8B and that can be used with any mobile phone or other device capable of transmitting an audio signal or data signal wirelessly or via a wire. The data may cover a data based phone call or interaction with the phone through a digital assistant.

The speaker unit 212 and the clip case 202 is attached to form the device accessory 200 utilizing the at least one pivotal attachment means 214. The mobile phone 102 is attached to the device accessory 200 utilizing the at least one attachment means 206 adhered to the back side of the mobile phone 102 as illustrated in FIG. 8C. The at least one attachment means 206 fit into the at least one recess 204 on the clip case 202, which is pivotally attached to the speaker unit 212. When the at least one attachment means 206 are within the at least one recess 204, the clip case 202 is near the surface of the mobile phone 102 and the at least one magnet 210 on the at least one attachment means 206 holds the clip case 202, and the speaker unit 212, firmly to the mobile phone 102 as illustrated in FIG. 8D.

Figure 9:
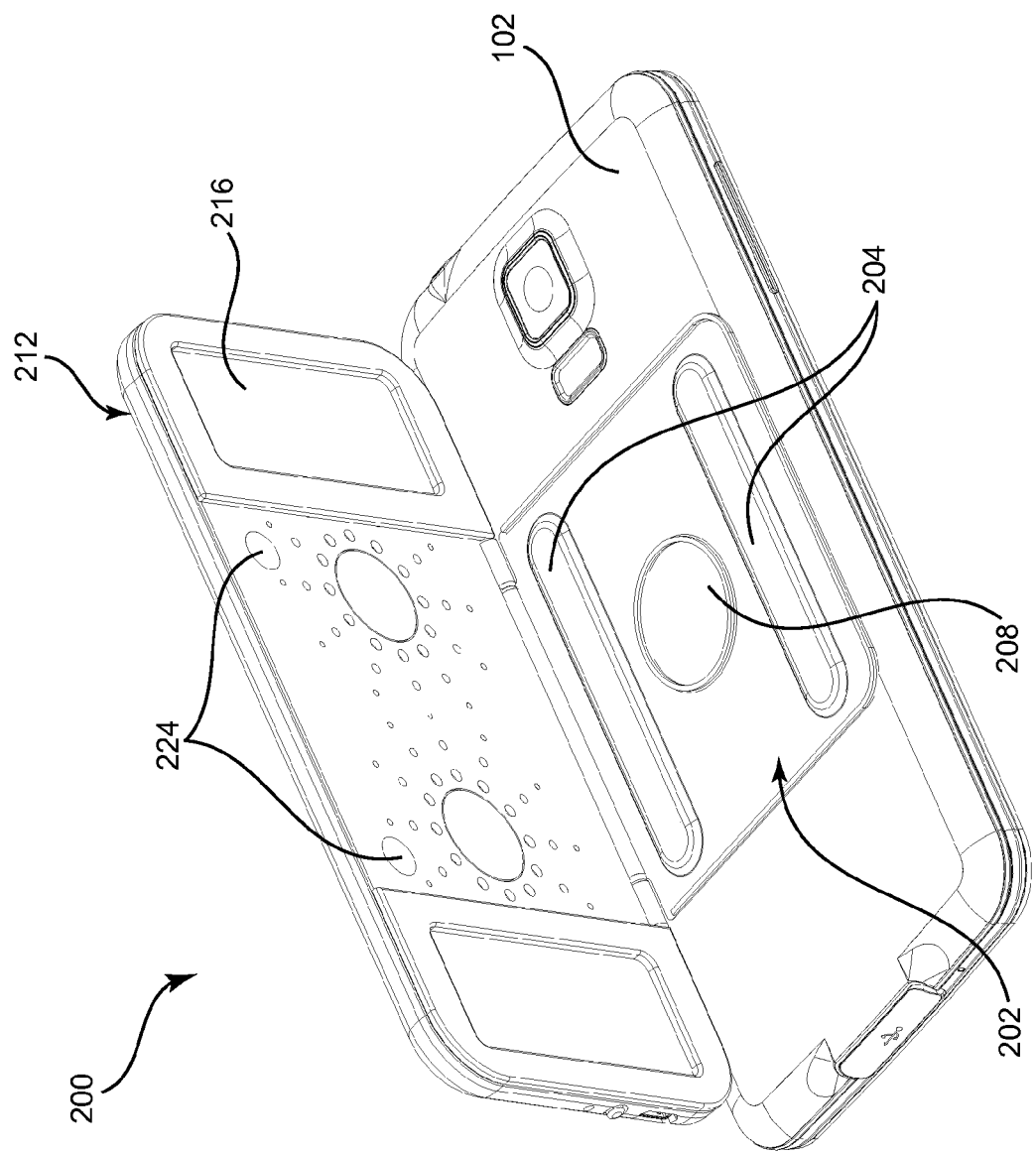
FIG. 9 illustrates an inner perspective view of the device accessory holding the portable communication device in accordance with one embodiment of the present invention in an unfolded configuration.

FIG. 9 illustrates an inner perspective view of the device accessory 200 attached to the mobile phone 102 with the speaker unit 212 in an unfolded configuration in accordance with one embodiment of the present invention. The speaker unit 212 is folded out from the clip case 202 via the pivotal attachment means 214. The mobile phone 102 is removably attached to the clip case 202 by the attraction between the at least one magnet 210 on the at least one attachment means 206 (see FIG. 8C) and the clip case 202. The at least one attachment means 206 is disposed within the at least one attachment means recess 204 on the clip case 202. The slot 208 present on the clip case 202 enables the user to use the center mounted camera on the mobile phone 102, when the device accessory 200 is folded away from the mobile phone 102. In an alternative embodiment the clip case 202 may be permanently fixed to the mobile device 102 by the use of adhesives such as double-sided foam tape. The at least one recess 216 in the speaker unit 212 accommodate any bulge on the mobile phone 102, including any camera which protrudes from the back of the mobile phone 102. The at least two magnets 224 on the speaker unit 212 hold the speaker unit 212 with the clip case 202 when the device accessory 200 is in the folded configuration, with an angle of 0 degrees between the clip case 202 and the speaker unit 212.

Figure 10:
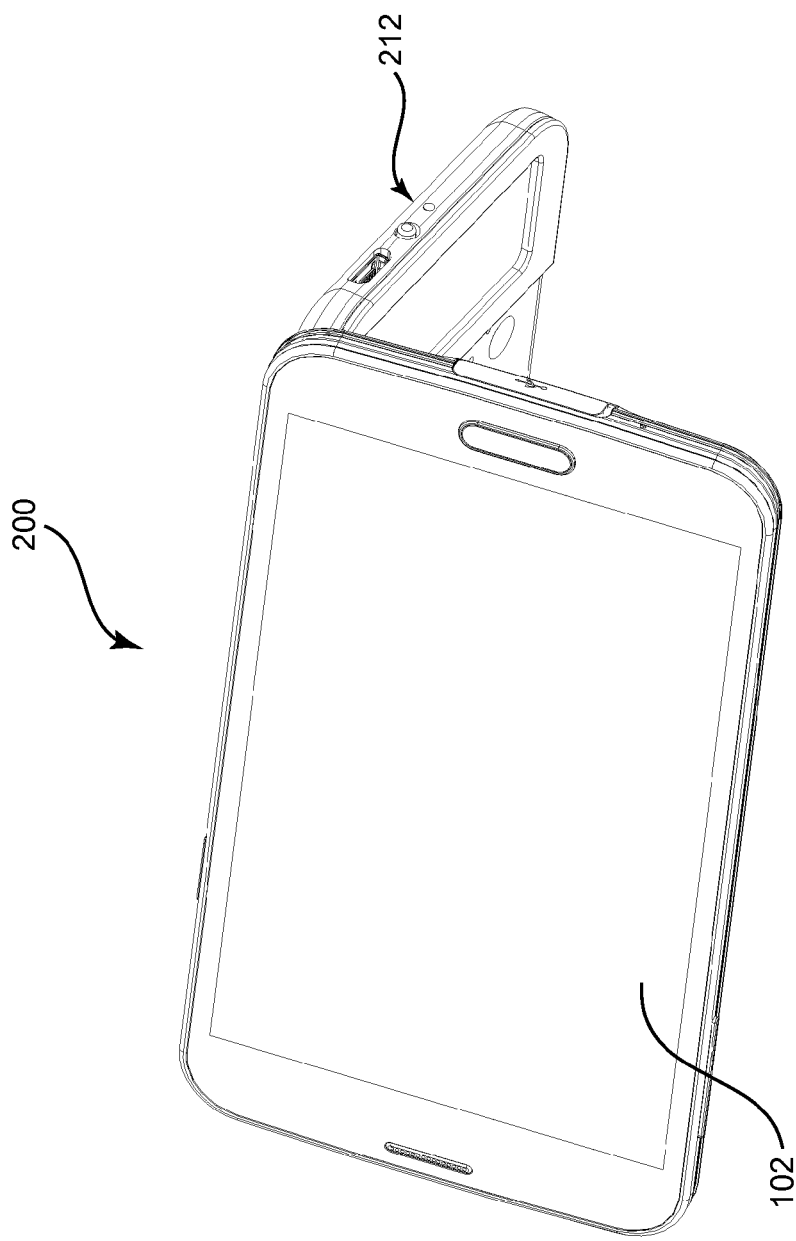
FIG. 10 illustrates a front perspective view of the device accessory attached to and supporting the portable communication device in accordance with one embodiment of the present invention.

Turning to FIG. 10, a front perspective view of the device accessory 200 attached to and supporting the mobile phone 102 in accordance with one embodiment of the present invention is illustrated. The device accessory 200 holds the mobile phone 102 at a convenient angle for viewing the screen of the mobile phone 102.

Figure 11:
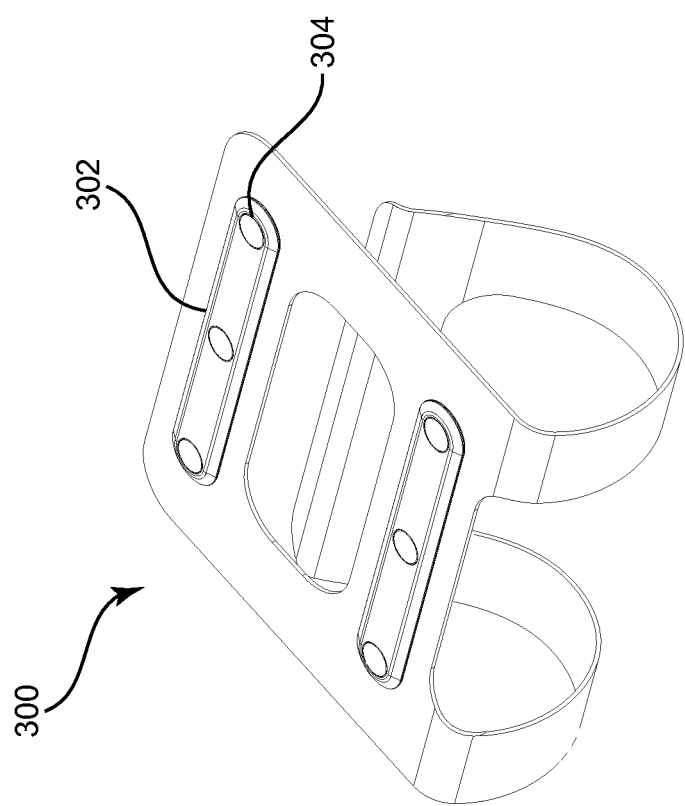
FIG. 11 illustrates a perspective view of a visor clip configured to work with one embodiment of the device accessory in accordance with the present invention.

FIG. 11 illustrates a perspective view of a visor clip 300 configured to work with the clip case 202 in accordance with one embodiment of the present invention. The visor clip 300 is preferably made from metal, such as spring steel, but in alternative embodiments it can be made of any appropriate material including composites and plastics. The visor clip 300 comprises at least one attachment means 302 having at least one magnet 304.

Figure 12:
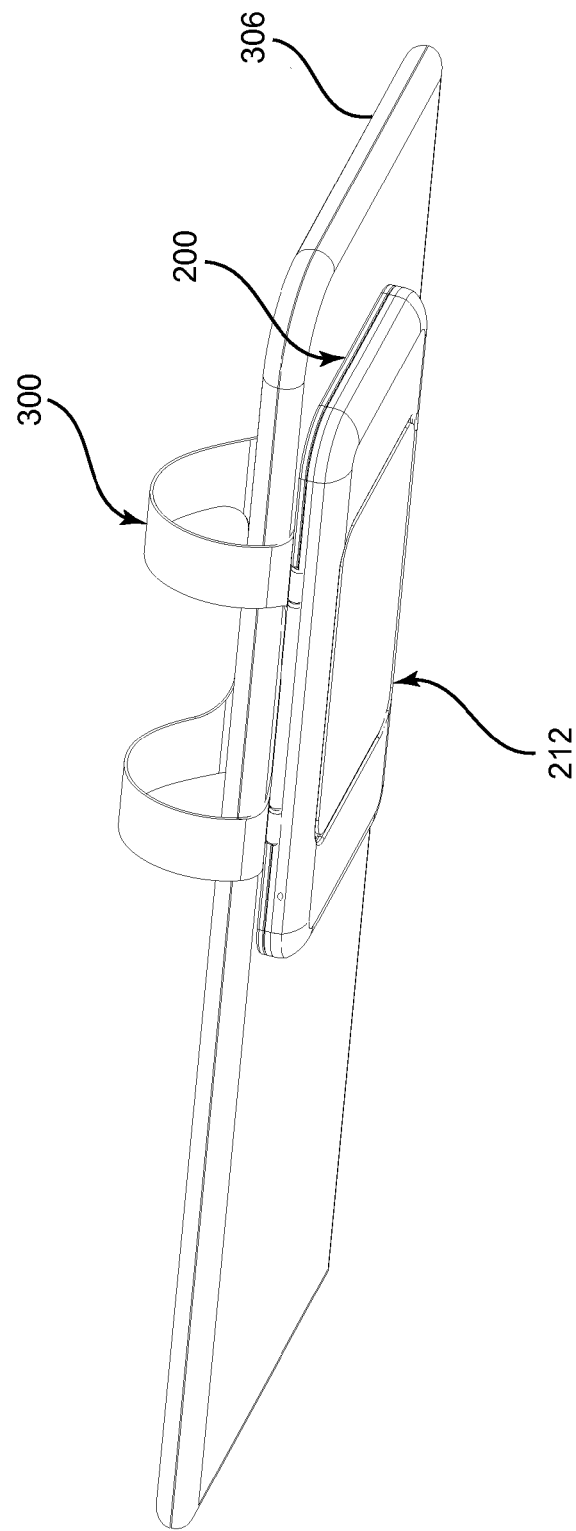
FIG. 12 illustrates a perspective view of the visor clip configured to work with one embodiment of the device accessory in accordance with the present invention in use.

FIG. 12 illustrates perspective view of the visor clip 300 configured to work with the device accessory 200 in accordance with one embodiment of the present invention in use. The visor clip 300 can be clipped to a visor 306, such as a visor found in an automobile, and to the clip case 202 of the device accessory 200 of the present embodiment. The device accessory 200 is attached to the visor clip 300 via the at least one attachment means 302 and the clip case 202. The use of the device accessory 200 with the visor clip 300 allows the accessory 200 to reproduce sound from another mobile phone just as is possible when the clip case 202 is attached to the mobile phone 102. When the device accessory 200 is connected to the visor clip 300 as shown in FIG. 12, the speaker unit 212 can be pivoted about the pivotal attachment means 214 between the speaker unit 212 and the clip case 202, just as is possible when the clip case 202 is attached to the mobile phone 102.

Figure 13:
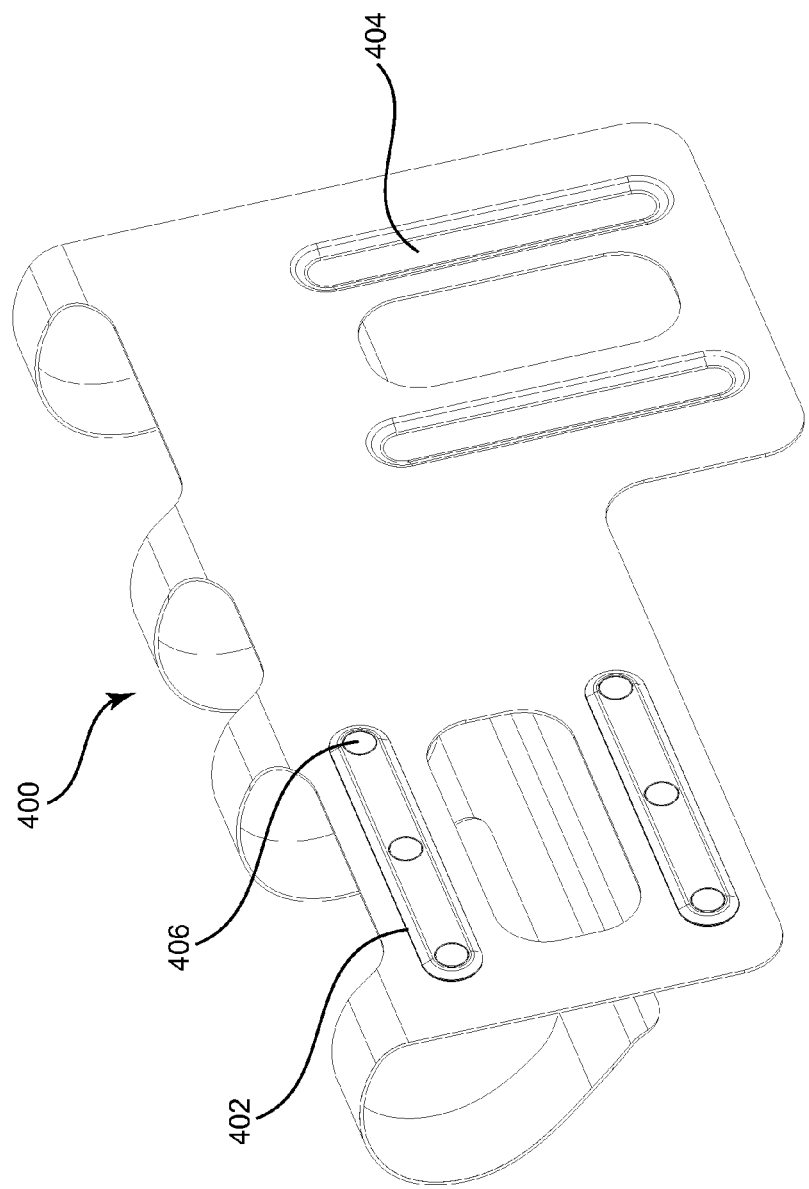
FIG. 13 illustrates a perspective view of a deluxe visor clip configured to work with one embodiment of the device accessory in accordance with the present invention.

FIG. 13 illustrates a perspective view of a deluxe visor clip 400 configured to work with the device accessory 200 in accordance with one embodiment of the present invention. The deluxe visor clip 400 comprises at least one attachment means 402 having at least one magnet 406. The at least one attachment means 402 is made of rubber. The deluxe visor clip 400 is designed to simultaneously hold the speaker unit 212 and the mobile phone 102 side by side.

Figure 14:
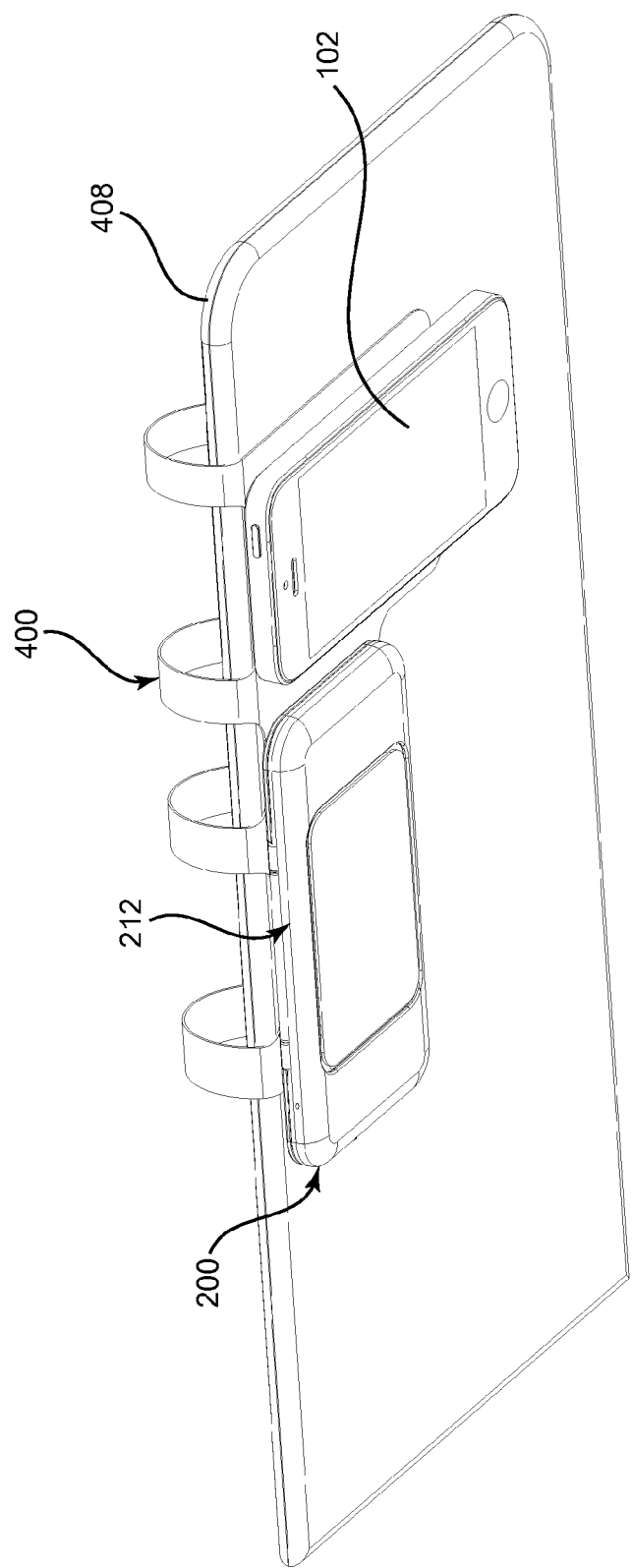
FIG. 14 illustrates a perspective view of the deluxe visor clip configured to work one embodiment of the device accessory in accordance with the present invention in use.

FIG. 14 illustrates a perspective view of a deluxe visor clip 400 configured to work with the device accessory 200 in accordance with one embodiment of the present invention in use. The deluxe visor clip 400 is clipped to a visor 408, such as a visor found in an automobile, and the device accessory 200 via at least one attachment means 402 having at least one magnet 406 and the clip case 202. The mobile phone 102 is attached to the deluxe visor clip 400 via the at least one recess 404 and at least one attachment means 206 (see FIG. 8C) attached to the back of the mobile phone 102. The deluxe visor clip 400 illustrated in the present embodiment allows the device accessory 200 to reproduce sound transmitted from the mobile phone 102, or from another device capable of sending an audio signal wirelessly or via a wire. The speaker unit 212 can be pivoted about the pivotal attachment means 214 between the speaker unit 212 and the clip case 202 just as is possible when the clip case 202 is attached to the mobile phone 102. The deluxe visor clip 400 can be used with either the speaker unit 212 or the mobile phone 102 separately.

Figure 15C:
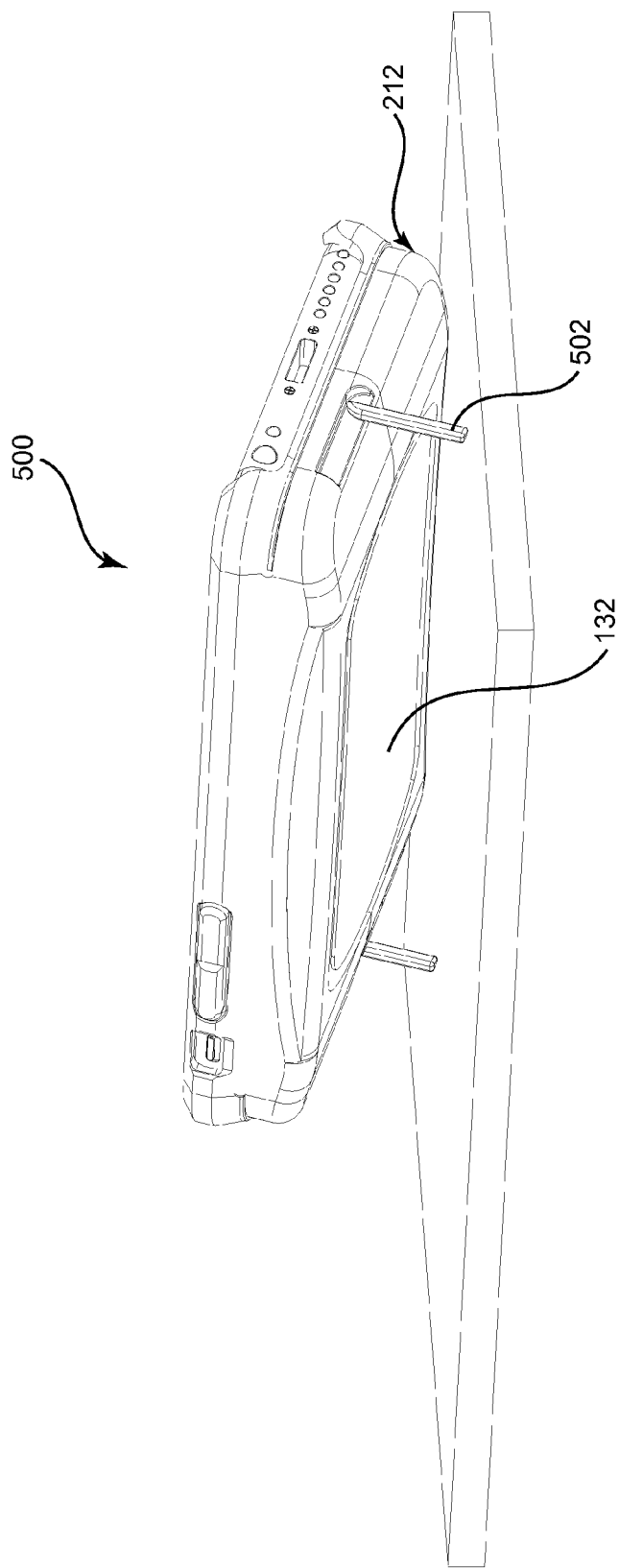
FIG. 15C illustrates a rear perspective view of the device accessory having at least a pair of flip out support means in accordance with one embodiment of the present invention in use.

FIGS. 15A-15C, illustrate a device accessory 500 having at least a pair of flip out support means 502 in accordance with one embodiment of the present invention. In this embodiment, the speaker unit 212 includes a pair of flip out support means 502 positioned on the edge, adjacent to the edge having the pivotal attachment means. The flip out support means 502 enables the user to position the device accessory 500 on a flat surface, when the speaker unit 212 and the clip case 202 holding the mobile phone is in the most compact folded configuration as illustrated in FIG. 15B and FIG. 15C. In this embodiment, the flat surface on which the device accessory is positioned reflects the sound produced by the at least one flat panel speaker 132 and results in a high frequency sound effect.

Figure 16:
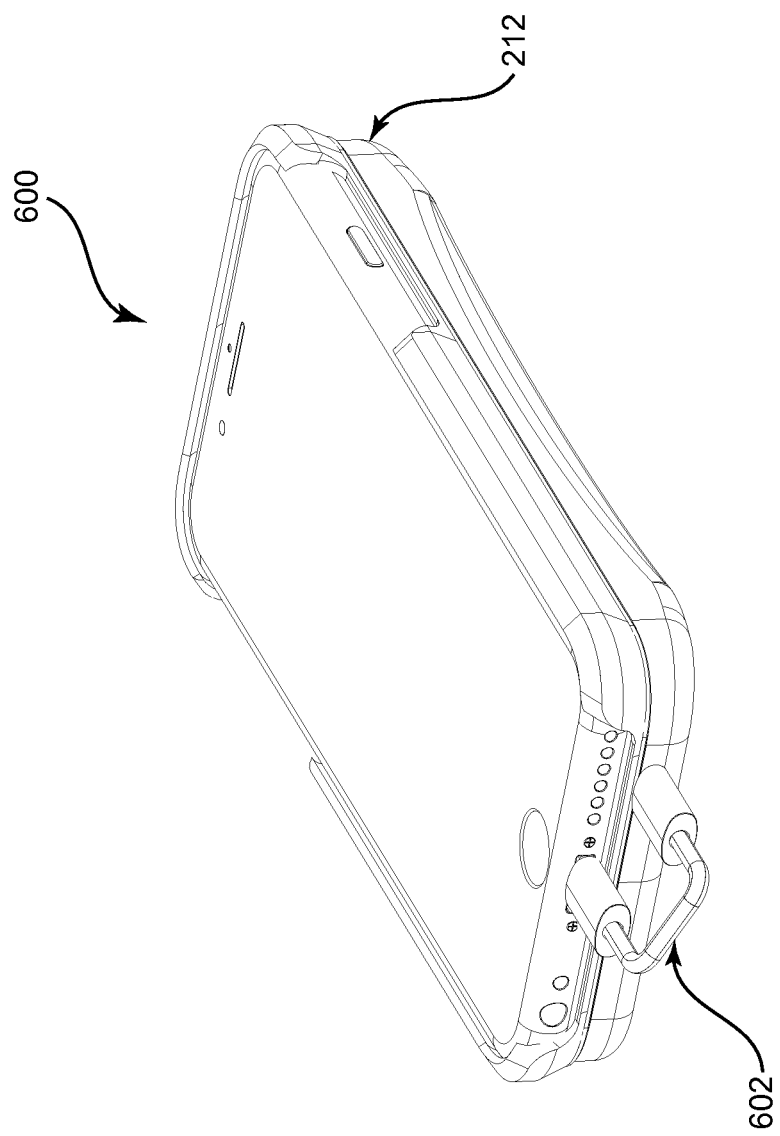
FIG. 16 illustrates a perspective view of a device accessory employed as an auxiliary power source for the portable communication device in accordance with one embodiment of the present invention.

FIG. 16 illustrates a perspective view of the device accessory 600 that functions as an auxiliary power source for the mobile phone in accordance with one embodiment of the present invention. In this embodiment, the speaker unit 212 includes a separate port and a connecting means 602. The connecting means 602 is a short cable. In this embodiment the battery imbedded in the speaker unit 212 can also be used as an auxiliary battery to provide charge for the mobile phone by employing the connecting means 602. The connecting means 602 is connected between the separate port on the speaker unit 212 and the charging port 218 of the mobile phone.

FIGS. 17A-17B illustrate a side view of the device accessory 100 and a universal device accessory 700 employing the speaker unit 124 in accordance with one embodiment of the present invention respectively. The universal device accessory 700 allows larger or smaller mobile phones to work with the speaker unit 124. In preferred embodiment the speaker unit 124 of the device accessory 100 is the same as the mobile phone 102 as shown in FIG. 17A. In other embodiment, the portion of the universal device accessory 700 that grips the mobile phone 102 is wider to accommodate the larger size of the mobile phone 102 as illustrated in FIG. 17B. When this embodiment is used with the larger mobile phone 102, the speaker unit 124 and electrical components are all the same size, but the molded section of the universal device accessory 700 is larger in size to fit the larger mobile phone 102 as illustrated in FIG. 17B.

Figure 18:
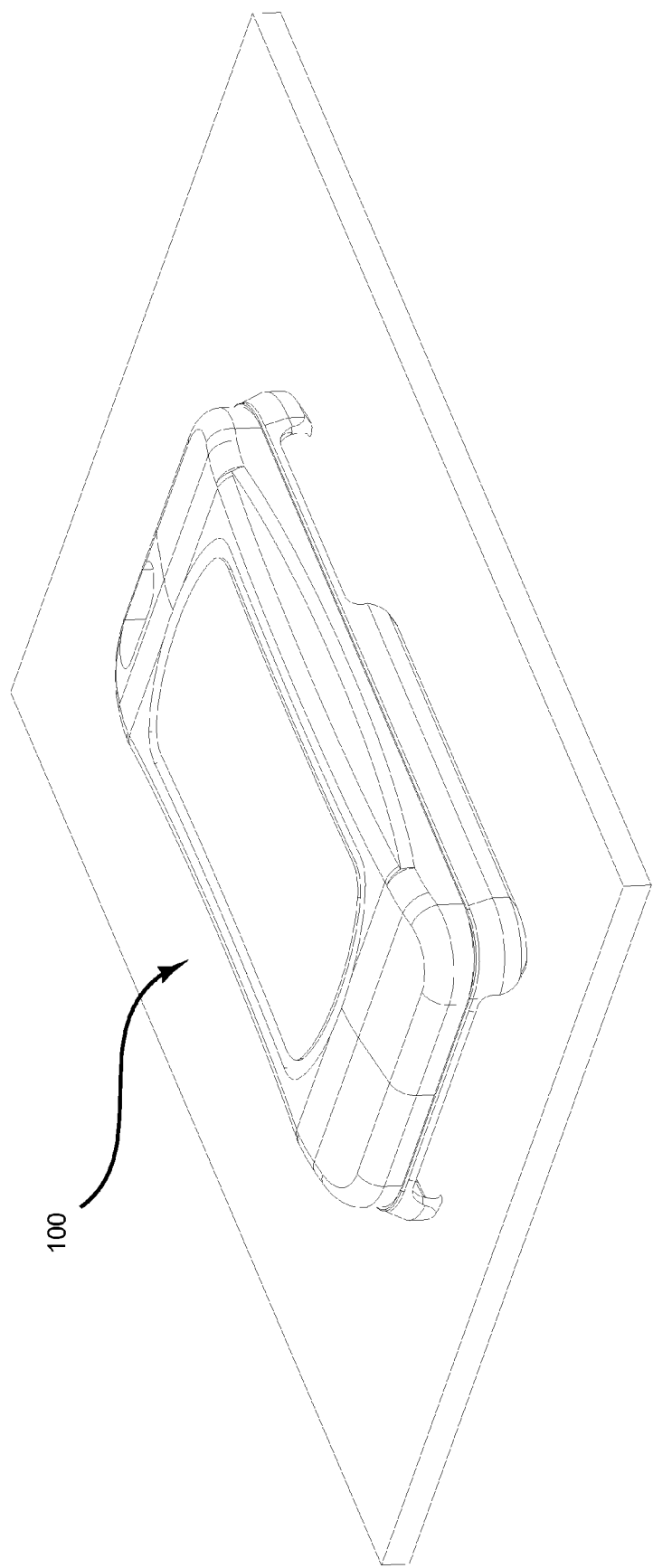
FIG. 18 illustrates a perspective view of the device accessory absent of a mobile phone and wherein the device accessory is face down on a substantially flat surface.

FIG. 18 illustrates one use of the device accessory 100 wherein the device is positioned facing downward on a substantially flat surface. In this configuration the light material such as carbon fiber is facing upwards away from the substantially flat surface and the openings on the opposite side of the device accessory 100 are facing the substantially flat surface.

In a preferred embodiment the speaker unit weighs less than 2 oz, in alternative embodiments it may weigh more than 2 oz but less than 4 oz, and in yet additional embodiments it may weigh more than 4 oz. In a preferred embodiment the speaker unit is less than 6 mm thick, but in alternative embodiments it may be less than 10 mm thick or may be thicker than 10 mm.

In some embodiments the device accessory comprises two flat panel speakers, each comprising a carbon fiber board excited by a mini exciter located inside the speaker unit. In alternative embodiments the device accessory may comprise one or more than two flat panel speakers. In one embodiment, each of the two flat panel speakers uses one audio channel and enables the speaker unit to create stereo sound. In yet another embodiment, the flat panel speaker may be positioned such that it is physical contact with an external object, through which the audio vibrations are transmitted.

In some embodiments the device accessory comprises only one mini exciter located inside the speaker unit. In some embodiments, the device accessory can contain more than one exciter, preferable up to four exciters.

In some embodiments of the device accessory the flat panel speakers transmits sound not only from the side of the speaker unit on which the flat panel speakers are disposed, but also in part though the mobile phone held by the accessory, enabling the user of the mobile device to hear sound when the device is held close to but not against the user's ear.

In the preferred embodiment the device accessory comprises a single cell 3.7V lithium ion battery and integrated circuit amplifiers, for example sourced from Texas Instruments or Maxim Integrated. In alternative embodiments the speaker unit may comprise any suitable power storage device including but not limited to batteries and fuel cells. In some embodiments the device accessory may comprise circuits configured to boost voltage in a distortion controlled manner, and in other embodiments the speaker unit circuits may employ at least one of: automatic gain control, speaker sensing, and voltage boost. In other embodiments the battery may draw power from a supply power to the battery in the mobile phone. In yet other embodiments the system does not draw any power from the mobile phone and the only additional power required of the mobile device in addition to the power it requires for normal operation is the power required to wirelessly communicate with the device case, which may or may not be attached to the mobile phone.

In the embodiments wherein the device accessory communicates wirelessly with at least one mobile phone, this may occur via at least one of Bluetooth, Bluetooth 4.0, and BLE. In alternative embodiments the device accessory may communicate with the at least one mobile phone through any means known in the art including but not limited to wireless connections and wired connections. The device case may additionally comprise NFC, allowing the device accessory to pair with the mobile phone by simply tapping the mobile phone against the device accessory. In other embodiments the device accessory may wirelessly connect to multiple mobile phones and other personal audio devices, such as tablets, laptops, the Apple iPad and iPhone, whether or not the device accessory is connected or encasing such devices. In this sense any nearby device capable of wireless communication with the device accessory may play audio through it. Multi-point Bluetooth may be utilized in these instances.

In some embodiments the device accessory may be water resistant and comprise speaker enclosures such as those marketed under the name Gore Acoustic Vents. In still other embodiments the device accessory may include clips for connecting the mobile phone case to other objects, such as vehicle sun visors, backpacks, walls, bicycles, quad runners and other motorsports vehicles etc.

With respect to the above description, it is to be realized that material disclosed in the applicant's drawings and description may be modified in certain ways while still producing the same result claimed by the applicant. Such variations are deemed readily apparent and obvious to one skilled in the art, and all equivalent relationships to those illustrated in the drawings and equations and described in the specification are intended to be encompassed by the present invention.

The foregoing description of the preferred embodiment of the present invention has been presented for the purpose of illustration and description. It is not intended to be exhaustive or to limit the invention to the precise form disclosed. Many modifications and variations are possible in light of the above teachings. It is intended that the scope of the present invention not be limited by this detailed description, but by the claims and the equivalents to the claims appended hereto.

What is claimed is:

1. A device accessory for mounting a portable communication device, the device accessory comprising:
   a clip case for holding the portable communication device, the clip case comprising:
      a base portion having an inner side and an outer side, the inner side adaptable to receive the portable communication device, the outer side includes at least two magnets and a recess configured to hold a support means, the support means being configured to orient the portable communication device at a plurality of angular positions;
      a plurality of side walls attached to the base portion, the plurality of side walls configured to snugly hold and to prevent the portable communication device from sliding off the clip case, at least one of the plurality of side walls includes a pair of side magnets; and
      a first pivotal attachment means attached to the base portion, the first pivotal attachment means pivotally connects the support means to the base portion; and
   a speaker unit adaptable to attach with the clip case, the speaker unit comprises:
      a pair of lower magnets positioned on a front surface of the speaker unit and proximate to the at least two magnets on the base portion of the clip case;
      a support means magnet configured to pull the support means from the recess to a pivotal connection angle;
      at least one flat panel speaker excited by at least one mini exciter; the at least one flat panel speaker and the at least one mini exciter being positioned inside the speaker unit;
      a microphone positioned inside the speaker unit, the microphone allows the speaker unit to be used as a speakerphone;
      a pair of speaker side magnets configured to keep the device accessory in a fully extended configuration, the fully extended configuration being at an angle of 180 degrees between the clip case and the speaker unit;
      a second pivotal attachment means adaptable to align with the first pivotal attachment means thereby attaching the clip case with the speaker unit;
      a charging port configured to charge the speaker unit;
      an ON/OFF button configured to turn on and turn off the speaker unit; and
      an indicator positioned on at least one side of the speaker unit configured to indicate whether the speaker unit is turned on or turned off;
   whereby the at least one flat panel speaker emanates high quality and high volume sound produced from the portable communication device and the support means supports the portable communication device at convenient angles for viewing the screen of the portable communication device.

2. The device accessory of claim 1 wherein the pair of lower magnets being positioned proximate to the at least two magnets on the base portion of the clip case.

3. The device accessory of claim 1 wherein the clip case is made from a material selected from a group consisting of:

plastic, metal, rubber, acrylic, glass, or other materials known in the art of mobile device cases.

4. The device accessory of claim 1 wherein the support means is made from a material selected from a group consisting of: plastic, composite, metal and ceramic.

5. The device accessory of claim 1 wherein the attraction between the at least two magnets on the outer side of the clip case and the pair of lower magnets on the speaker unit hold the speaker unit and the clip case in place in their most compact folded configuration.

6. The device accessory of claim 1 wherein the clip case and the speaker unit are pivotally connected by means of the first pivotal attachment means and the second pivotal attachment means.

7. The device accessory of claim 1 wherein the pivotal connection between the clip case and the speaker unit allows an orientation of zero degree to 180 degrees between the clip case and the speaker unit in unfolded configuration.

8. The device accessory of claim 1 wherein the first pivotal attachment means provides the speaker unit with default angle configurations selected from a group consisting of: 0 degree, 30 degrees and 180 degrees.

9. The device accessory of claim 1 wherein the attraction between the pair of side magnets and the pair of speaker side magnets keep the clip case and the speaker unit in a fully extended unfolded configuration at an angle of 180 degrees.

10. The device accessory of claim 1 wherein the pivotal connection angle limit of the support means is 30 degrees.

11. A device accessory for holding a mobile phone, the device accessory comprising:
  a clip case for holding the mobile phone, the clip case comprising:
    a base portion having an inner side to receive the mobile phone and an outer side having at least two magnets and a recess configured to hold a support means, the support means being designed to orient the mobile phone at a plurality of angular positions;
    a plurality of side walls attached to the base portion to snugly hold the mobile phone, at least one of the plurality of side walls includes a pair of side magnets attached thereon; and
    a first pivotal attachment means attached to the base portion and designed to pivotally connect the support means with the base portion; and
  a speaker unit adaptable to attach with the clip case, the speaker unit comprises:
    a pair of lower magnets positioned on a front surface of the speaker unit;
    a support means magnet pulls the support means secured at the recess and orients the support means to a pivotal connection angle limit along with the speaker unit;
    at least one flat panel speaker with at least one carbon fiber board excited by at least one mini exciter positioned inside the speaker unit;
    a microphone positioned inside the speaker unit, the microphone allows the speaker unit to be used as a speakerphone;
    a pair of speaker side magnets configured to keep the device accessory in a fully extended configuration at an angle of 180 degrees between the clip case and the speaker unit;
    a second pivotal attachment means adaptable to align with the first pivotal attachment means thereby attaching the clip case with the speaker unit;
    a charging port configured to charge the speaker unit;
    an ON/OFF button configured to turn on and turn off the speaker unit; and
    an indicator positioned on at least one side of the speaker unit configured to indicate whether the speaker unit id turned on or turned off;
  whereby the at least one flat panel speaker generates high quality and high volume sound produced from the mobile phone and the support means support the mobile phone.

12. The device accessory of claim 11 wherein the clip case is made from a material selected from a group consisting of: plastic, metal, rubber, acrylic, glass, or other materials known in the art of mobile device cases.

13. The device accessory of claim 11 wherein the support means is made from a material selected from a group consisting of: plastic, composite, metal and ceramic.

14. The device accessory of claim 11 wherein the attraction between the at least two magnet on the outer side of the clip case and the pair of lower magnets on the speaker unit hold the speaker unit and the clip case in place in their most compact folded configuration.

15. The device accessory of claim 11 wherein the clip case and the speaker unit are pivotally connected by means of the first pivotal attachment means and the second pivotal attachment means.

16. The device accessory of claim 11 wherein the pivotal connection between the clip case and the speaker unit allows forming an angle between 0 degree and 180 degrees between the clip case and the speaker unit at unfolded configuration.

17. The device accessory of claim 11 wherein the attraction between the pair of side magnets and the pair of speaker side magnets keep the clip case and the speaker unit in a fully extended unfolded configuration at an angle of 180 degrees.

18. The device accessory of claim 11 wherein the first pivotal attachment means provides the speaker unit with default angle configurations selected from a group consisting of: 0 degree, 30 degrees and 180 degrees.

19. A device accessory for holding a mobile phone, the device accessory comprising:
  a clip case for holding the mobile phone, the clip case comprising:
    a base portion having an inner side and an outer side adaptable to receive the mobile phone, the outer side includes at least two magnets and a recess configured to hold a support means;
    a plurality of side walls attached to the base portion with at least one of the plurality of side walls having a pair of side magnets; and
    a first pivotal attachment means designed to pivotally connect the support means to the base portion; and
  a speaker unit adaptable to attach with the clip case, the speaker unit comprises:
    a pair of lower magnets positioned on a front surface of the speaker unit and proximate to the at least two magnets on the base portion of the clip case;
    a support means magnet configured to pull the support means from the recess to a pivotal connection angle limit along with the speaker unit;
    at least one flat panel speaker with at least one carbon fiber board excited by at least one mini exciter positioned inside the speaker unit;
    a microphone positioned inside the speaker unit, the microphone allows the speaker unit to be used as a speakerphone;

a pair of speaker side magnets configured to keep the clip case and the speaker unit in a fully extended configuration;

a second pivotal attachment means adaptable to align with the first pivotal attachment means thereby attaching the clip case with the speaker unit;

a charging port configured to charge the speaker unit;

an ON/OFF button configured to turn on and turn off the speaker unit; and an indicator positioned on at least one side of the speaker unit configured to indicate whether the speaker unit id turned on or turned off;

whereby the at least one flat panel speaker generates high quality and high volume sound produced from the mobile phone.

20. The device accessory of claim 19 wherein the support means supports the mobile phone at convenient angles for viewing the screen of the mobile phone.

21. The device accessory of claim 19 wherein the plurality of side walls configured to snugly hold the mobile phone and to prevent it from sliding off the clip case.

22. The device accessory of claim 19 wherein the clip case is made from a material selected from a group consisting of: plastic, metal, rubber, acrylic, glass, or other materials known in the art of mobile device cases.

23. The device accessory of claim 19 wherein the support means is made from a material selected from a group consisting of: plastic, composite, metal and ceramic.

24. The device accessory of claim 19 wherein the attraction between the at least two magnet on the outer side of the clip case and the pair of lower magnets on the speaker unit hold the speaker unit and the clip case in place in their most compact folded configuration.

25. The device accessory of claim 19 wherein the clip case and the speaker unit are pivotally connected by means of the first pivotal attachment means and the second pivotal attachment means to form a most compact folded configuration.

26. The device accessory of claim 19 wherein the pivotal connection between the clip case and the speaker unit allows forming an angle between 0 degree and 180 degrees between the clip case and the speaker unit in unfolded configuration.

27. The device accessory of claim 19 wherein the attraction between the pair of side magnets and the pair of speaker side magnets keep the clip case and the speaker unit in a fully extended unfolded configuration at an angle of 180 degrees.

28. The device accessory of claim 19 wherein the first pivotal attachment means provides the speaker unit with default angle configurations selected from a group consisting of: 0 degree, 30 degrees and 180 degrees.

* * * * *